(12) United States Patent
Benjamin et al.

(10) Patent No.: US 9,744,563 B2
(45) Date of Patent: Aug. 29, 2017

(54) UNDULATORY STRUCTURES

(75) Inventors: Zachariah Benjamin, Bardon (AU);
Colin Robert Smith, Watanobbi (AU)

(73) Assignee: TECHTONIC PTY LTD, Bardon, Queensland (AU)

( * ) Notice: Subject to any disclaimer, the term of this patent is extended or adjusted under 35 U.S.C. 154(b) by 1191 days.

(21) Appl. No.: 13/824,333

(22) PCT Filed: Sep. 26, 2011

(86) PCT No.: PCT/AU2011/001237
§ 371 (c)(1),
(2), (4) Date: May 6, 2013

(87) PCT Pub. No.: WO2012/040775
PCT Pub. Date: Apr. 5, 2012

(65) Prior Publication Data
US 2013/0220074 A1 Aug. 29, 2013

(30) Foreign Application Priority Data
Sep. 27, 2010 (AU) .................. 2010904340
Apr. 20, 2011 (AU) .................. 2011901482

(51) Int. Cl.
*B06B 3/02* (2006.01)
*F04B 19/20* (2006.01)
(Continued)

(52) U.S. Cl.
CPC ............ *B06B 3/02* (2013.01); *B06B 1/14* (2013.01); *F03G 7/00* (2013.01); *F03G 7/065* (2013.01);
(Continued)

(58) Field of Classification Search
CPC .... F04D 29/305; F04D 29/382; F04D 29/002; F04D 15/0055; F04D 33/00; F03B 3/10;
(Continued)

(56) References Cited

U.S. PATENT DOCUMENTS 3,019,834 A * 2/1962 Montignot .............. B21C 37/12
72/135
3,227,598 A 1/1966 Robb
(Continued)

FOREIGN PATENT DOCUMENTS

CN 22313-1450 A 9/2011
JP 9-32719 A 2/1997

OTHER PUBLICATIONS

Coelho et al., "Shape-changing interfaces", Personal and Ubiquitous Computing, Germany, Springer, Jul. 29, 2010, vol. 15, Issue 2, p. 161-173.
(Continued)

*Primary Examiner* — Dwayne J White
*Assistant Examiner* — Adam W Brown
(74) *Attorney, Agent, or Firm* — Birch, Stewart, Kolasch & Birch, LLP

(57) ABSTRACT

An undulatory structure and methods for the fabrication and use thereof. The undulatory structure includes a buckled sheet and one or more work input elements for deforming the buckled sheet in an undulating manner wherein each point in a series of points on a sinuously-shaped profile of the buckled sheet travels at least partially along a figure eight-shaped path. The undulatory structure can be adapted for use as a solid-state transducer wherein the buckled sheet provides mechanical advantage without appreciable opposition from elastic restoring forces, thereby achieving improved force, displacement and efficiency characteristics.

22 Claims, 13 Drawing Sheets

(51) Int. Cl.
*F04B 43/00* (2006.01)
*F03G 7/06* (2006.01)
*B06B 1/14* (2006.01)
*F03G 7/00* (2006.01)
*F16H 35/00* (2006.01)

(52) U.S. Cl.
CPC .......... *F04B 19/20* (2013.01); *F04B 43/0054* (2013.01); *F16H 35/00* (2013.01); *Y10T 29/49826* (2015.01); *Y10T 74/18888* (2015.01)

(58) Field of Classification Search
CPC ... B06B 3/02; B06B 1/14; F16H 35/00; F03G 7/00; F03G 7/065; F04B 43/0054; F04B 43/023; F04B 43/043; F04B 43/046; F04B 19/20; F05B 2240/301; F05B 2240/311; F05B 2250/02; F05B 2280/5001; Y10T 29/49826; Y10T 74/1888
USPC ........................................................ 417/436
See application file for complete search history.

(56) References Cited

U.S. PATENT DOCUMENTS

| | | | |
|---|---|---|---|
| 3,316,415 A | 4/1967 | Taylor | |
| 3,343,655 A | 9/1967 | Howard | |
| 3,964,316 A | 6/1976 | Abe | |
| 4,010,612 A | 3/1977 | Sandoval | |
| 4,183,153 A | 1/1980 | Dickson | |
| 4,562,374 A | 12/1985 | Sashida | |
| 5,431,634 A * | 7/1995 | Brown | A61M 5/14224 417/413.1 |
| 5,471,721 A | 12/1995 | Haertling | |
| 5,632,841 A | 5/1997 | Hellbaum et al. | |
| 6,050,787 A * | 4/2000 | Hesketh | F04B 43/09 251/129.01 |
| 6,236,143 B1 | 5/2001 | Lesieutre et al. | |
| 6,269,500 B1 | 8/2001 | Saringer | |
| 6,362,559 B1 | 3/2002 | Boyd | |
| 6,655,923 B1 * | 12/2003 | Lisec | B81C 1/00357 417/412 |
| 6,909,224 B2 | 6/2005 | Ghandi et al. | |
| 7,321,185 B2 | 1/2008 | Schultz | |
| 7,626,319 B2 | 12/2009 | Heim | |
| 2007/0063544 A1* | 3/2007 | Browne | B60R 21/38 296/187.09 |
| 2009/0186196 A1 | 7/2009 | Seffen et al. | |

OTHER PUBLICATIONS

International Search Report, dated Dec. 22, 2011, for International Application No. PCT/AU2011/001237.
Audoly et al., "Secondary buckling patterns of a thin plate under in-plane compression," The European Physical Journal B, vol. 27, No. 1, 2002, pp. 7-10.
Banala et al., "Design and Optimization of a Mechanism for Out of Plane Insect Wing Like Motion With Twist, " Journal of Mechanical Design, vol. 127, No. 4, 2005, pp. 841-844 (pp. 1-10 provided).
Boulahbal, "Self-Excited Vibrations of a Spinning Disk," Doctoral Dissertation, Massachusetts Institute of Technology, May 22, 1995, pp. 1-185.
Bowen et al., "Morphing and Shape Control using Unsymmetrical Composites," Journal of Intelligent Material Systems and Structures, vol. 18, No. 1, Jan. 2007, pp. 89-98.
Cerda et al, "Thin films: Wrinkling of an elastic sheet under tension," Nature, vol. 419, Oct. 10, 2002, pp. 579-580.
Concha et al., "Wrinkling of a bilayer membrane," Physical Review E, vol. 75, No. 1, 2007, (Nov. 20, 2006), pp. 1-9.
Cotterell et al., "Thermal Buckling of Circular Plates," Ministry of Aviation, Aeronautical Research Council Reports and Memoranda, Her Majesty's Stationery Office, R & M No. 3245, Sep. 1960, 16 pages.
Dano, "SMA-Induced Deformations in General Unsymmetric Laminates," Doctoral Dissertation, Virginia Polytechnic Institute and State University, Blacksburg, VA, Apr. 22, 1997, pp. 1-143 (155 pages total).
Demaine et al., "(Non)existence of Pleated Folds: How Paper Folds Between Creases," AAMAS, 2009 (Preprint Jun. 25, 2009), pp. 1-19.
Galinski et al., "Insect-like flapping wing mechanism based on a double spherical Scotch yoke," Journal of the Royal Society Interface, vol. 2, No. 3, 2005 (Published online May 18, 2005), pp. 223-235.
Gallego et al., "Buckling as a new perspective on static balancing of mechanisms," 13th World Congress in Mechanism and Machine Science, Guanajuato, Mexico, A23_545, Jun. 19-25, 2011, pp. 1-7.
Guest et al., "A Zero-Stiffness Elastic Shell Structure," Journal of Mechanics of Materials and Structures, vol. 6, No. 1-4, 2011 (Jan.-Jun. 2011), pp. 203-212 (11 pages total).
Henderson et al., "Crocheting the Hyperbolic Plane," The Mathematical Intelligencer, vol. 23, No. 2, 2001, pp. 17-28.
Herder, "Energy-Free Systems: Theory, Conception, and Design of Statically Balanced Spring Mechanisms," Doctoral Dissertation, TU Delft, Delft University of Technology, 2001, pp. 1-248 (268 pages total).
Hu et al., "Biological inspirations, kinematics modeling, mechanism design and experiments on an undulating robotic fin inspired by Gymnarchus niloticus," Mechanism and Machine Theory, vol. 44, No. 3, 2009 (Available online Nov. 4, 2008), pp. 633-645.
Jiang et al., "A Motion Amplifier Using an Axially Driven Buckling Beam: I. Design and Experiments," Nonlinear Dynamics, vol. 43, No. 4, 2006, pp. 391-409.
Kebadze et al., "Bistable prestressed shell structures," International Journal of Solids and Structures, vol. 41, No. 11, 2004 (Available online Mar. 5, 2004), pp. 2801-2820.
Kim et al., "Investigation into the wrinkling behaviour of thin sheets in the cylindrical cup deep drawing process using bifurcation theory," International Journal for Numerical Methods in Engineering, vol. 56, No. 12, 2003, pp. 1673-1705.
Kofod et al., "Self-organized minimum-energy structures for dielectric elastomer actuators," Applied Physics A, vol. 85, No. 2, 2006 (Published online Sep. 2, 2006), pp. 141-143.
Krylov et al., "Experimental confirmation of the propulsion of marine vessels employing guided flexural waves in attached elastic fins," Journal of Fluids and Structures, vol. 23, No. 2, 2007 (Available online Nov. 7, 2006), pp. 297-307.
Low et al., "Biomimetic Motion Planning of an Undulating Robotic Fish Fin," Journal of Vibration and Control, vol. 12, No. 12, 2006, pp. 1337-1359.
Mattioni et al., "The Analysis of Cool-Down and Snap-Through of Cross-Ply Laminates Used as Multistable Structures," ABAQUS UK Group Conference, 2006, pp. 1-11.
Murphey et al., "A novel Actuated Composite Tape-Spring for Deployable Structures," Proceedings of the 45th AIAA/ASME/ASCE/AHS/ASC Structures, Structural Dynamics & Materials Conference, Apr. 2004, pp. 19-22 (pp. 1-11 provided).
Norman et al., "Multistable Textured Shell Structures," Advances in Science and Technology, Trans Tech Publications, vol. 54, 2008 (Available online Sep. 2, 2008), pp. 168-173.
Oukhaled et al., "Twisting and buckling: a new undulation mechanism for artificial swimmers," The European Journal E, vol. 35, No. 11, 2012 (Preprint Nov. 10, 2011), pp. 1-4.
Portela et al., "Analysis of morphing, multi stable structures actuated by piezoelectric patches," Computers & Structures, vol. 86, No. 3, 2008, pp. 347-356 (pp. 1-10 provided).
Rossiter et al., "A Self-switching Bistable Artificial Muscle Actuator," 2006 SICE-ICASE International Joint Conference, Bexco, Busan, Korea, Oct. 18-21, 2006, pp. 5847-5852 (6 pages).
Schultz et al., "Neutrally stable behavior in fiber-reinforced composite tape springs," Composites: Part A: Applied Science and Manufacturing, vol. 39, No. 6, 2008, pp. 1012-1017.
Vehar et al., "Closed-Loop Tape Springs as Fully Compliant Mechanisms—Preliminary Investigations," American Society of Mechani-

(56) References Cited

OTHER PUBLICATIONS cal Engineers, ASME 2004 International Design Engineering Technical Conferences and Computers and Information in Engineering Conference, Jan. 2004, pp. 1-10.

Vidoli et al., "Tristability of thin orthotropic shells with uniform initial curvature," The Royal Society, Proceedings of the Royal Society of London A: Mathematical, Physical and Engineering Sciences, vol. 464, No. 2099, Nov. 2008, pp. 2949-2966 (pp. 1-20 provided).

Vos et al., "Post-buckled precompressed elements: a new class of control actuators for morphing wing UAVs," Smart Materials and Structures, vol. 16, No. 3, May 18, 2007, pp. 919-926.

Zhao et al., "Post-buckling and Snap-through Behavior of Inclined Slender Beams," Journal of Applied Mechanics, vol. 75, No. 4, 2008, 12 pages.

\* cited by examiner

Figure 1A
Figure 1B
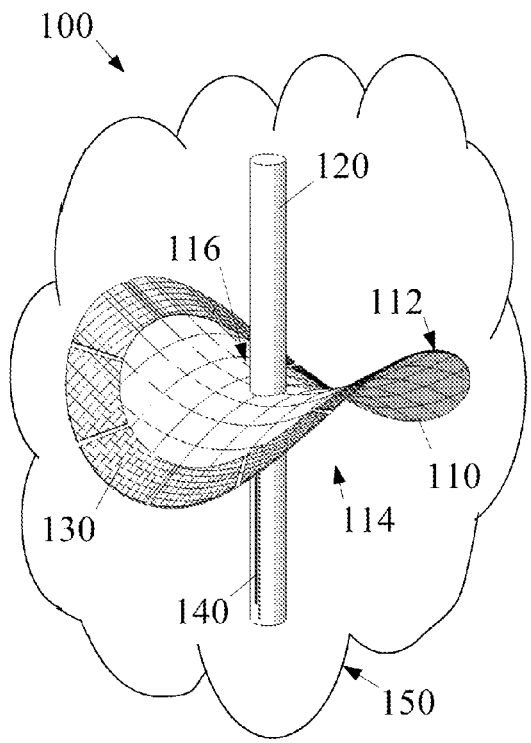
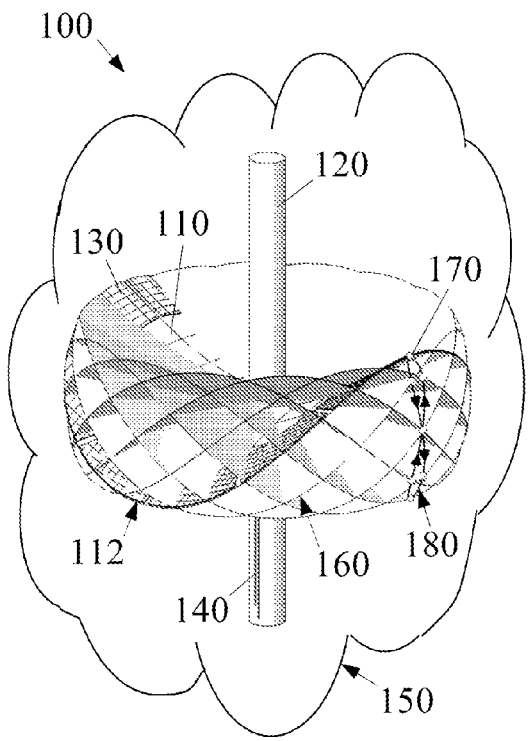
Figure 2
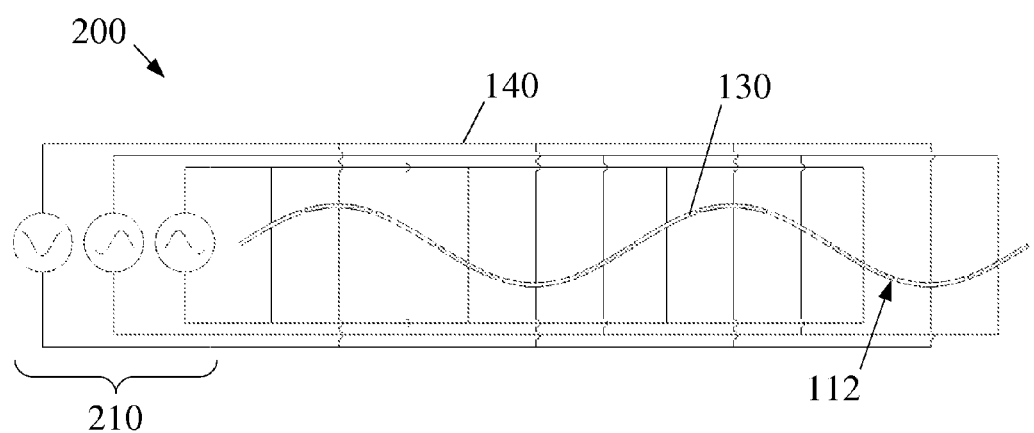

UNDULATORY STRUCTURES

CROSS-REFERENCE TO APPLICATIONS

This application is the National Phase under 35 U.S.C. §371 of PCT international Application No. PCT/AU2011/001237, which has an International filing, date of Sep. 26, 2011, and which claims priority under 35 U.S.C. §119 to Australian Provisional Application No. 2010904340, filed on Sep. 27, 2010, and Australian Provisional Application No. 2011901482, filed on Apr. 20, 2011.

FIELD OF THE INVENTION

The present invention relates generally to structures that include an undulatable buckled sheet and to methods for their fabrication and use. In particular, but not exclusively, the present invention relates to a diverse range of machines that utilise undulatory structures to perform work. Particular embodiments of the invention described herein include: transducers, fans, pumps, loudspeakers, heat engines and undulatory propulsion systems.

DESCRIPTION OF THE PRIOR ART

Undulatory propulsion systems are exemplary of machines that utilise undulatable members for performing work. Biologically inspired from certain types of fish and rays, man-made undulatory propulsion systems typically produce thrust by undulating fluid-immersed fins. Unlike conventional rotary propulsion systems, undulatory propulsion systems may be constructed without rotary bearings and seals, which due to tight tolerance gaps between moving parts are prone to failure through wear, ingress of foreign matter and corrosion. In aquatic environments, undulatory propulsion systems are potentially less noisy, less environmentally damaging and less susceptible to cavitation and impact damage than conventional propeller-based propulsion systems.

Despite the potential advantages of undulatory propulsion systems and decades of related research, few, if any, are commercially produced due to their cost, complexity and performance. Known undulatory propulsion systems typically require many actuators and sophisticated control systems. The robotic fish described in the Journal of Vibration and Control Vol. 12 No. 12 (2006) pp. 1337-1359 (Low et al.) for example, has 20 servomotors and six micro-controllers to actuate a pair of fins.

Adding further complexity and potential points of failure, the fins of the previously mentioned robotic fish are made of rigid segments interconnected with sliding joints. The sliding joints are needed to accommodate a varying distance between actuation elements, which is a common problem with fin-based undulatory propulsion systems. An alternative solution has been to construct the fin from a flexible material that allows slack to form between actuation elements, but this detrimentally affects the systems propulsive efficiency and power handling capability.

A comparatively simple undulatory propulsion system operable with a single actuation element and without electronic control is described in the Journal of Fluids and Structures 23 (2007) pp. 297-307 (Krylov et al.). It uses a motor driven pivot arm to generate an elastic wave in a rubber strip having one clamped longitudinal edge. A drawback of the systems simplicity is that the general shape of the rubber strip is unconstrained and is influenced by a number of factors that tend to make power delivery suboptimal and difficult to control. In particular, damping by the surrounding fluid reduces the amplitude of the elastic wave with increasing distance from the motor driven pivot arm, and reflection of the elastic wave may result in destructive interference.

A device having a sinuous fin-like element similar to a number of undulatory propulsion systems that is capable of being driven by relatively few actuator elements is presented in the SICE-ICASE International Joint Conference October 2006 pp. 5847-5852 (Rossiter et al.). The device comprises a series of actuator elements mounted on an elastically buckled beam. A particular activation sequence of the actuator elements produces a circular deformation path at the beams midpoint, which can be used to incrementally convey a solid object with the aid of a platform to unload the object from the beams midpoint over part of its circular deformation path. Undesirably, the device conveys solid objects with a non-uniform motion, requires high actuation force to cyclically lift the conveyed object, and suffers efficiency losses due to non-recovery of potential energy in both elastic and gravitational forms.

As will be described below, undulatable buckled sheets may function as mechanical transformers. Mechanical transformers are widely used to match the impedance of a mechanical energy source to a load using mechanical advantage. Analogous to an electrical transformer that alters the ratio of voltage to current of electrical power between input and output terminals, a mechanical transformer alters the ratio of force to velocity of mechanical power.

Mechanical transformers used in conjunction with solid-state transducers are usually integrated within the transducer's architecture. Well-known types of transducer architectures that provide mechanical advantage include bender, lever-arm and flextensional configurations. A characteristic generally found in solid-state transducers, even when used in configurations providing mechanical advantage, is that they experience a net elastic restoring force that increasingly opposes deformation away from an equilibrium position. Consequently, the net elastic restoring force reduces output capability and causes output distortion. Under oscillatory conditions, the net elastic restoring force combines with mass and damping characteristics of the transducer to produce a frequency dependant response, typically resulting in poor transducer efficiency except at a narrowband resonant frequency.

Few transducer architectures incorporating mechanical transformers have been reported that counterbalance internal elastic forces to reduce or eliminate net elasticity and its effects. One such transducer architecture is described in U.S. Pat. No. 6,236,143 (Lesieutre et al.), which uses axial compression to prebuckle a piezoelectric bender element thereby reducing its lateral stiffness. Although elastic forces within the prebuckled bender element may be counterbalanced in one position, the architecture suffers from the effects of elasticity in operation because it does not have a neutrally stable deformation path. Transducer architectures that do have a neutrally stable deformation path include continuous belt based designs exemplified by U.S. Pat. No. 4,010,612 (Sandoval), and neutrally elastic tape springs such as described in the Proceedings of the 45th AIAA/ASME/ASCE/AHS/ASC Structures, Structural Dynamics and Materials Conference April 2004, pp. 19-22, (Murphey et al). While overcoming disadvantages associated with net elastic restoring forces, both these transducer architectures have poor power density due to having only a small proportion of their total actuation capability effective at any given time. Furthermore, neutrally elastic tape springs are unsuitable for many applications due to a generally poor resistance to deformation, not just along their neutrally stable path. On the other hand, continuous belt designs tend to be more robust, but are burdened by the weight and volume of support structures needed to maintain belt tension.

Saddle-shaped structures can be found, among other places, in architecture, but generally do not have counter-balanced elastic forces making them ill-suited for use in machines as mechanical transformers. U.S. Pat. No. 4,183,153 (Dickson) describes hyperbolic geometry models produced by joining specific shapes of flexible material that can yield a saddle-shaped structure with at least partially balanced elastic forces. The described method of fabrication produces a join that is a potential point of failure, and may create discontinuities in geometry and material properties that obstruct fine elastic balance.

In light of the prior art, it is an object of the present invention to address or at least ameliorate one or more of the disadvantages or shortcomings of the prior art, or at least provide the public with a useful alternative. Further objects will be evident from the following description.

SUMMARY OF THE INVENTION

Embodiments of the present invention relate to structures comprising a buckled sheet that is deformable in an undulating manner.

In one form, although it need not be the only, or indeed the broadest form, the invention resides in a structure comprising:

a buckled sheet having a sinuously-shaped profile; and one or more work input elements in communication with the buckled sheet for deforming the buckled sheet in an undulating manner wherein each point in a series of points on the sinuously-shaped profile travels at least partially along a figure eight-shaped path relative to a common frame of reference.

Preferably, the buckled sheet is saddle-shaped wherein it has a sinuously-shaped profile viewed from a circumferential section thereof. In other configurations the buckled sheet may have a sinuously-shaped profile viewed from a linear or a curved section thereof, making possible undulating structures that more resemble fish fins. The shape of the buckled sheet may also be impacted by the way in which the sinuously-shaped profile varies in amplitude in a direction extending normally from the section from which it is viewed; in various configurations the amplitude may be substantially constant, monotonic, or sinuously-varying.

In another form, although it need not be the broadest form, the invention resides a structure, comprising:

a buckled sheet having a saddle point wherein a section of the buckled sheet adjacent to the saddle point has a saddle shape; and one or more work input elements connected to the section of the buckled sheet for acting to rotatably reorientate the saddle shape of the section in relation to the saddle point by deforming the buckled sheet.

Preferably, in each of the forms described above, the structure is a machine for performing work on one or more bodies in communication with the machine, whereby the buckled sheet performs work on the one or more bodies as a result of being deformed in an undulating manner. In these embodiments, the buckled sheet may act as a mechanical transformer configured to provide mechanical advantage between the one or more work input elements and the one or more bodies in communication with the machine.

Preferably, in each form of the structure described above, the buckled sheet is deformable in an undulating manner with substantially constant net strain energy, whereby the buckled sheet may be deformed without appreciable opposition from elastic restoring forces.

In yet another form, although it need not be the broadest form, the invention resides in a method for performing work on one or more bodies in communication with a buckled sheet having a sinuously-shaped profile, the method including deforming the buckled sheet wherein each point in a series of points on the sinuously-shaped profile of the buckled sheet travels at least partially along a figure eight-shaped path relative to a common frame of reference whereby the buckled sheet moves in an undulating manner and exerts a motion-producing force on the one or more bodies as a result of the deformation.

In still another form, although it need not be the broadest form, the invention resides in a method of fabricating a structure comprising the steps of:

forming a sinuously-shaped profile in a compliant sheet by inducing buckling stresses therein; and providing at least one work input element in communication with the compliant sheet for causing each point in a series of points on the sinuously-shaped profile to travel a figure eight-shaped path relative to a common frame of reference.

Preferably, forming a sinuously-shaped profile in a compliant sheet includes inducing residual stresses in the compliant sheet by a forming process of rolling, peening, planishing or spinning. Alternatively or additionally, forming a sinuously-shaped profile in a compliant sheet includes externally stressing the compliant sheet.

Further forms and features of the present invention will become apparent from the following detailed description.

Definitions

As used herein, a "sheet" refers to a shaped product of which the thickness is small relative to its length and width, whether flat or not and whether a constant thickness or not; and includes the following terms within its definition: plate, strip, foil, film, shell, membrane, ribbon, disk and annulus.

As used herein, the term "buckled" refers to a post-buckled state in which a sheet has bent, warped or wrinkled as a result of an elastic instability.

As used herein, "acceleration" is defined as including "deceleration".

BRIEF DESCRIPTION OF THE DRAWINGS

In order that the present invention may be readily understood and put into practical effect, reference will now be made to the accompanying drawings wherein:

FIG. 1A illustrates a perspective view of a structure according to one aspect of the present invention;

FIG. 1B illustrates movement of the structure shown in FIG. 1A in operation;

FIG. 2 shows an electrical schematic of the structure of FIG. 1A;

DETAILED DESCRIPTION OF THE DRAWINGS

Figure 3:
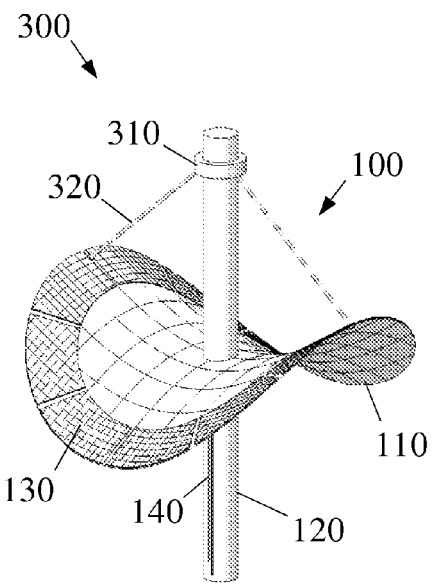
FIG. 3 illustrates a perspective view of a linear transducer according to another aspect of the present invention.

FIG. 1A illustrates a structure 100, according to one aspect of the present invention. The structure 100 comprises a buckled sheet 110 having distributed compliance, fixedly connected at its centre to a support shaft 120. The buckled sheet 110 is buckled by residual stresses therein, providing it with: a sinuously-shaped, and in preferred embodiments, a sinusoidally-shaped circumferential profile 112; an overall saddle shape 114 resembling a hyperbolic paraboloid, the saddle shape 114 having a central saddle point 116 wherein the sinusoidally-shaped circumferential profile 112 increases in amplitude with increasing distance from the central saddle point 116; and neutral stability. The structure 100 further comprises work input elements in the form of twelve piezoelectric actuator segments 130 mounted annularly on the buckled sheet 110 in unimorph fashion. Electrical connectors 140 running along the support shaft 120 and buckled sheet 110 provide electrical power to the actuator segments 130. Optionally, a fluid 150 surrounding and in communication with the buckled sheet 110 provides a body upon which the buckled sheet 110 can perform work when it is deformed.

FIG. 1B shows movement of the structure 100 in operation wherein the actuator segments 130 act to deform the buckled sheet 110 in an undulating manner in response to a particular series of of electrical inputs. Motion time-series 160 shows an undulatory deformation path of the buckled sheet 110 wherein the saddle shape 114 is rotatably reorientated in relation to the saddle point 116. Representing motion of one point in a series of points on the sinusoidally-shaped circumferential profile 112 throughout the motion time-series 160, a marker 170 travels along a curved out-of-plane, figure eight-shaped path 180 relative to the support shaft 120. While the buckled sheet 110 can be deformed in an undulating manner without appreciable opposition from elastic restoring forces, it should be noted that the saddle shape 114 has considerable stability for its weight due to its biaxial curvature.

FIG. 2 shows an electrical schematic 200 of the structure 100, with the actuator segments 130 depicted in circumferential profile. The actuator segments 130 conform to the sinusoidally-shaped circumferential profile 112 of the buckled sheet 110 and consequently have sinusoidally varying curvature. A three-phase power supply 210 provides electrical power to the actuator segments 130 through electrical connectors 140. Each phase of the power supply 210 is connected to a group of actuator segments 130 that dynamically have a matching magnitude of curvature by virtue of symmetry of the sinusoidally-shaped circumferential profile 112. Alternate actuator segments 130 are configured with reversed polarity so as to match the apparent direction of curvature of the actuator segments 130 as seen by each phase of the power supply 210. Activation of the actuator segments 130 by the power supply 210 act to align the sinusoidally varying curvature of the buckled sheet 110 and actuator segments 130 with a rotating sinusoidal pattern of circumferential bending forces that result from the activation.

Advantageously, undulatory deformation of the buckled sheet 110 occurs with substantially constant net strain energy, or in other words, along a neutrally stable deformation path wherein elastic forces are dynamically counterbalanced in both the buckled sheet 110 and actuator segments 130. Consequently, actuation forces produced by the actuator segments 130 are undiminished by localised elastic restoring forces, allowing the structure 100 to exhibit improved force, displacement and distortion characteristics, as well as high efficiency and wideband performance compared to traditional transducer architectures. In addition to being elastically balanced, undulatory deformation of the buckled sheet 110 is dynamically balanced due to motional symmetry such that forces exerted by the buckled sheet 110 on the support shaft 120 that could result in noise and vibration are minimised.

By using the actuator segments 130 to deform the buckled sheet 110 such that its saddle shape 114 is rotatably reorientated, the structure 100 can function as a morphing structure, which could be used, for example, as an aesthetic display or to vary flow of a fluid in a flow path. In a similar way, the structure 100 may function as a machine for performing work on the fluid 150. In doing so, the buckled sheet may act as a mechanical transformer, providing mechanical advantage to convert high stress, low strain expansion of the actuator segments 130 to low-force high-deflection of the fluid 150. In order to maximise the work performed on the fluid 150, the amount of mechanical advantage provided by the arrangement may be adjusted, for example, by the radial positioning of the actuator segments 130 on the buckled sheet 110.

When the fluid 150 is air, the structure 100 can function as a fan by generating airflow. Compared to conventional fans, the structure 100 has potential advantages of low noise, low cost and a resistance to dust fouling; and compared to blade type piezoelectric fans, has the ability to operate efficiently over a wide range of speeds. By configuring the three-phase power supply 210 to oscillate the speed of undulatory deformation of the buckled sheet 110, the structure 100 can function as a loudspeaker by generating acoustic energy. Compared to conventional moving coil loudspeakers, the structure 100 has potential advantages of high efficiency and low distortion due to: the ability to accelerate deformation of the buckled sheet 110 from any rotational orientation of the saddle shape 114 such that centring springs and accompanying electrical and mechanical damping typically used to manage oscillations generated by the centring springs are not required; the ability to precisely control the rotational orientation of the saddle shape of the buckled sheet 110; the capability of the buckled sheet 110 to produce large deflections; and high shape stability of the buckled sheet 110. The structure 100 can of course generate flow and acoustic energy in fluids other than air, such as water. Other functions may be performed by the structure 100 as will become apparent with reference to FIGS. 3 and 4.

FIG. 3 shows a linear transducer 300 comprising the structure 100, a slider 310 slidingly mounted on the support shaft 120 of the structure 100, and connecting rods 320 pivotably connected to the buckled sheet 110 of the structure 100 at one end, and pivotably connected at the other end to the slider 310. By using the actuator segments 130 to deform the buckled sheet 110 in an undulating manner, the transducer functions as a linear actuator wherein the slider 310 is urged to slide on the support shaft 120. Operated in reverse, the slider 310 may be driven by an oscillatory force in order to deform the buckled sheet 110 in an undulating manner whereby the actuator segments 130 generate electric charges. In this way, the linear transducer may function as a position sensor or as an electric generator.

Figure 4:
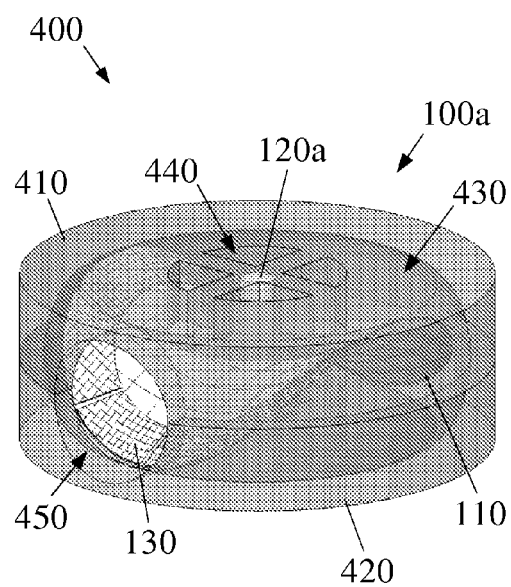
FIG. 4 illustrates a partially transparent perspective view of a pump according to another aspect of the present invention.

FIG. 4 illustrates a pump 400 comprising a modified structure 100a, similar to the structure 100 except for a shortened support shaft 120a. The shortened support shaft 120a is fixedly connected inside an upper half casing 410 and a lower half casing 420, with electrical connectors 140 (obscured) passing through and statically sealed in the lower half casing 420. The upper and lower half casings 410 and 420 are shown transparently to reveal a cavity 430 for accommodating undulatory deformation of the buckled sheet 110, and that forms a fluid flow path that includes fluid inlets 440, and a fluid discharge 450. Undulatory deformation of the buckled sheet 110 accelerates a fluid 150 (not shown) through the cavity 430. Advantageously, the pump can be hermetically sealed to eliminate fugitive emissions. The pump may also be used as an acoustic actuator by modulating the acceleration of the fluid 150.

Figure 5A:
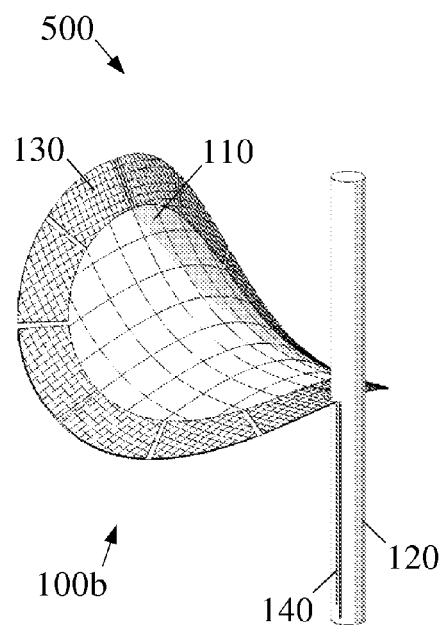
FIG. 5A illustrates a perspective view of a device according to another aspect of the present invention.
Figure 5B:
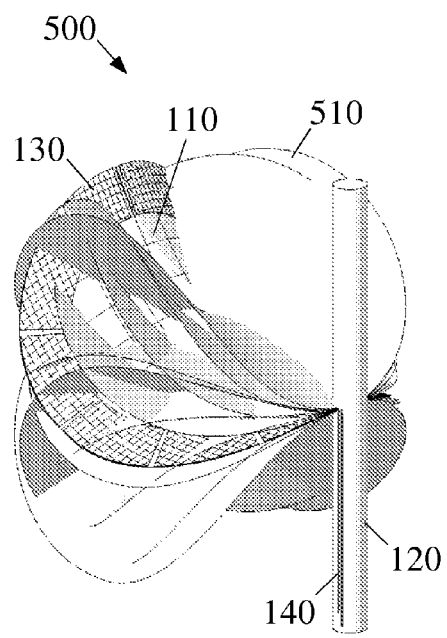
FIG. 5B shows movement of the device shown in FIG. 5A in operation.

FIG. 5A illustrates a device 500, particularly suited for use as a fan. The device 500 comprises a modified structure 100b, similar to the structure 100 except that the buckled sheet 110 is fixedly connected at its edge instead of its centre to the support shaft 120 so as to increase its peak displacement. FIG. 5B shows movement of the device 500 in operation, a motion time-series 510 showing the deformation path of the buckled sheet 110.

Figure 6A:
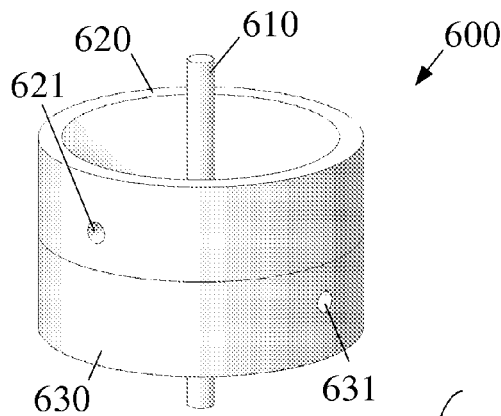
FIG. 6A illustrates a perspective view of a heat engine according to another aspect of the present invention.
Figure 6B:
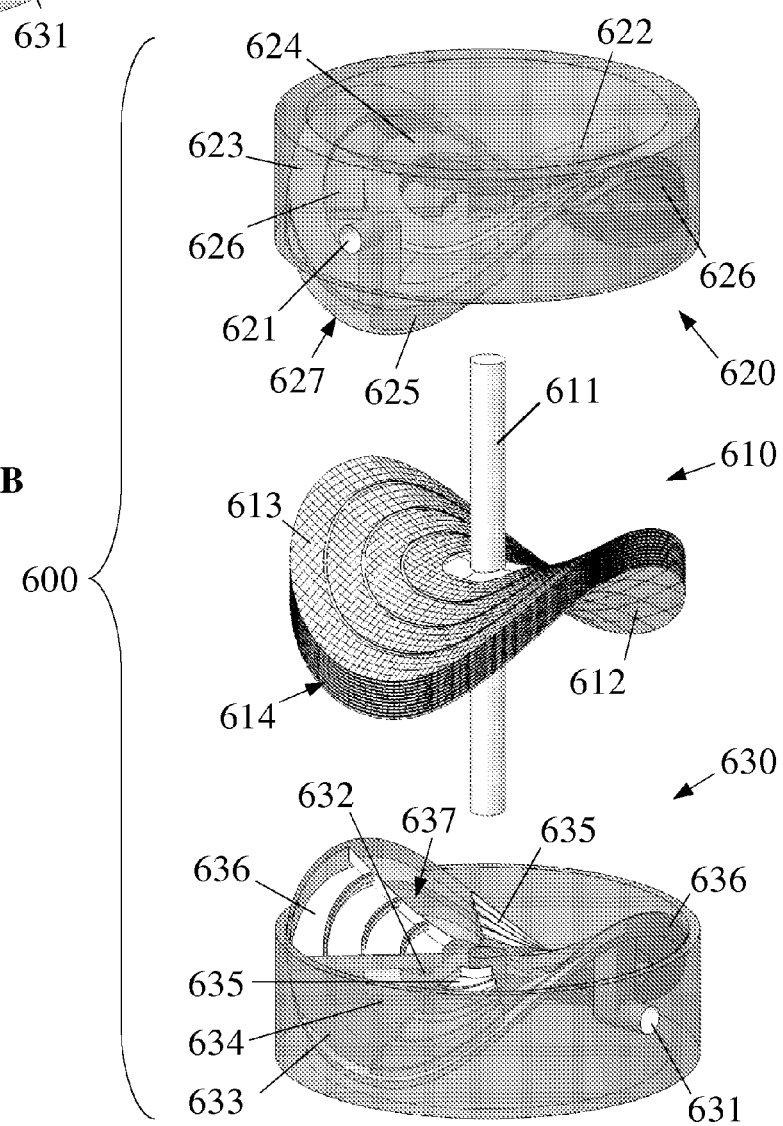
FIG. 6B illustrates an enlarged and partially transparent exploded perspective view of the heat engine shown in FIG. 6A.

FIGS. 6A and 6B illustrate a heat engine 600 according to another aspect of the present invention, FIG. 6B showing an enlarged and partially transparent exploded view to illustrate its structure. The heat engine 600 comprises a rotor 610, an upper half stator 620, and a lower half stator 630. The upper half stator 620 includes a hot fluid inlet 621, a hot fluid inlet header 623, hot fluid inlet ports 626, a cold fluid outlet 622, a cold fluid outlet header 624, cold fluid outlet ports 625, and a saddle-shaped upper contact surface 627. The lower half stator 630 includes a hot fluid outlet 631, a hot fluid outlet header 633, hot fluid outlet ports 636, a cold fluid inlet 632, a cold fluid inlet header 634, cold fluid inlet ports 635, and a saddle-shaped lower contact surface 637. The rotor 610 comprises a rotatable shaft 611, a plurality of neutrally stable, saddle-shaped buckled sheets 612 axially fixed to the rotatable shaft 611, and one or more annular strips 613 symmetrically disposed on and joined to each of the buckled sheets 612. The annular strips 613 have a different coefficient of thermal expansion to the buckled sheets 612 so as to form thermal bimorph elements 614 that act as work input elements for deforming the buckled sheets 612. The narrow width of the annular strips 613 is designed so that the thermal bimorph elements 614 act predominantly in a circumferential sense. The thermal bimorph elements 614 are sandwiched between the upper and lower contact surfaces 627 and 637, and are provided with perforations so as to form a hot fluid flow path 615 (not shown) between the hot fluid inlet ports 626 and the corresponding hot fluid outlet ports 636, and a cold fluid flow path 616 (not shown) between the cold fluid inlet ports 635 and the corresponding cold fluid outlet ports 625. Optionally, the rotor 610 further includes perforated compliant spacers disposed between adjacent thermal bimorph elements 614, and between the thermal bimorph elements 614 and the upper and lower half stators 620 and 630 to reduce friction and reduce fluid leakage between the hot and cold fluid flow paths 615 and 616.

Figure 7:
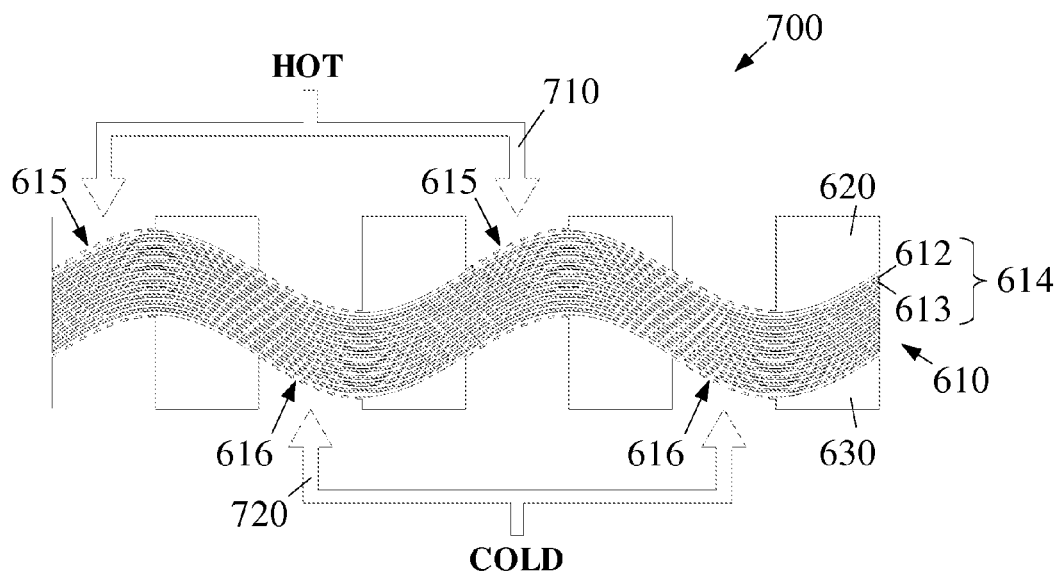
FIG. 7 shows a fluid flow schematic of the heat engine of FIG. 6A.

FIG. 7 shows a fluid flow schematic 700 of the heat engine 600 with the thermal bimorph elements 614 depicted in circumferential profile. A hot fluid 710 provides thermal energy to the heat engine 600 to be partially converted into mechanical work, and a cold fluid 720 enables the rejection of waste heat. The hot and cold fluids 710 and 720 pass through respective hot and cold fluid flow paths 615 and 616 so as to induce a temperature distribution in the thermal bimorph elements 614 configured to generate a pattern of circumferential bending forces in the thermal bimorph elements 614 that act to deform the buckled sheets 612 in an undulating manner. In order for the buckled sheets 612 to deform in an undulating manner, the thermal bimorph elements 614 push against the upper and lower contact surfaces 627 and 637 in such a way as to slidingly and meshingly engage with the upper and lower half stators 620 and 630 whereby the rotor 610 is caused to rotate in a continuous manner. Compared to continuous belt type heat engines that also cyclically deform an active sheet along a neutrally stable path, the heat engine 600 is capable of high power density due to: compact stacking of the thermal bimorph elements 614; and distributed bending of the thermal bimorph elements 614 allowing a high proportion of their actuation capability to be effective at any given time.

Figure 8:
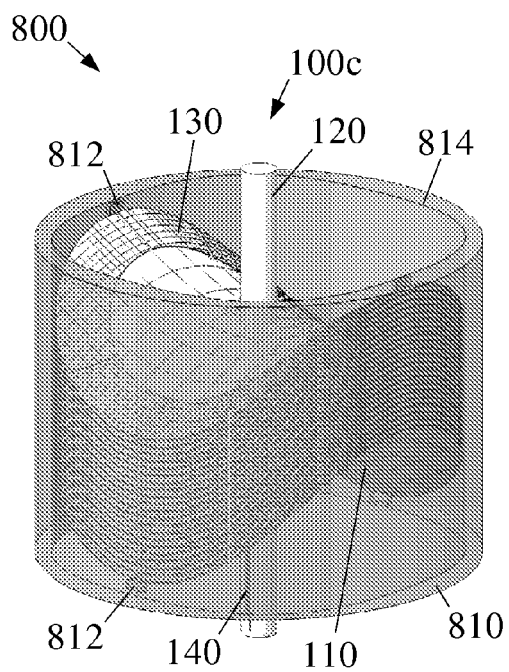
FIG. 8 illustrates a partially transparent perspective view of a periphery-coupled rotary actuator according to another aspect of the present invention.

In alternative embodiments of the heat engine 600, the buckled sheets 612 may be designed to engage with the upper and lower half stators 620 and 630 in additional or alternative ways. Illustrating one alternative way of engaging a saddle-shaped buckled sheet with a relatively rotating member, FIG. 8 shows a periphery-coupled rotary actuator 800 that comprises a modified structure 100c and a housing 810 that is shown transparently to reveal detail of the modified structure 100c. The modified structure 100c is similar to the structure 100 except for having more than one buckled sheet 110 fixedly connected at their respective centres to the support shaft 120 in order to provide stability relative to the housing 810, and to provide increased power output. The housing 810 includes: a number of protrusions 812 for preventing relative axial movement of the support shaft 120 by capturing the buckled sheets 110; and an internal profile 814 that is generally square in shape with rounded corners conforming to the profile of the buckled sheets 110 viewed from the top. Deformation of the buckled sheets 110 in an undulating manner causes the buckled sheets 110 to push against the housing 810 at their periphery in such a way as to slidingly and meshingly engage with the housing 810 whereby the support shaft 120 is caused to rotate relative to the housing 810 in a continuous manner.

Figure 9:
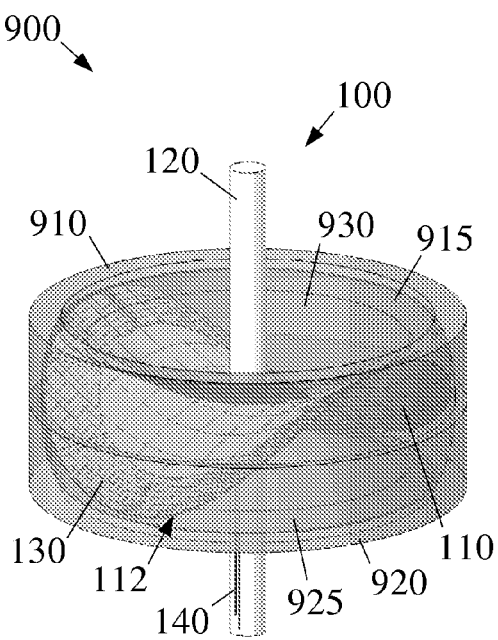
FIG. 9 illustrates a partially transparent perspective view of a friction-coupled rotary actuator according to another aspect of the present invention.

Illustrating another alternative way of engaging a saddle-shaped buckled sheet with a relatively rotating member, FIG. 9 shows a friction-coupled rotary actuator 900. The friction-coupled rotary actuator 900 comprises the structure 100, an upper half casing 910 having an upper friction surface 915, and a lower half casing 920 having a lower friction surface 925. The buckled sheet 110 of the structure 100 is sandwiched between the upper and lower friction surfaces 915 and 925 such that it is frictionally engaged with the upper and lower half casings 910 and 920 at crests and troughs of its sinusoidally-shaped circumferential profile 112. The upper and lower half casings 910 and 920 are shown transparently to reveal a void 930 formed therein configured to accommodate undulatory deformation of the buckled sheet 110 and relative rotation of the support shaft 120. With reference to FIG. 1B and the curved out-of-plane, figure eight-shaped path 180, deformation of the buckled sheet 110 in an undulating manner can be seen to cause a tangential motion at the crests and troughs of its sinusoidally-shaped circumferential profile 112, acting in the same clockwise sense relative to the support shaft 120 when viewed from above. This same-sense tangential motion of the buckled sheet 110 in areas it is in contact with the upper and lower friction surfaces 915 and 925 acts to move the buckled sheet 110 simultaneously on the upper and lower friction surfaces 915 and 925 in a rolling-like motion, whereby the support shaft 120 is caused to rotate relative to the upper and lower half casings 910 and 920 in a continuous manner.

Figure 10A:
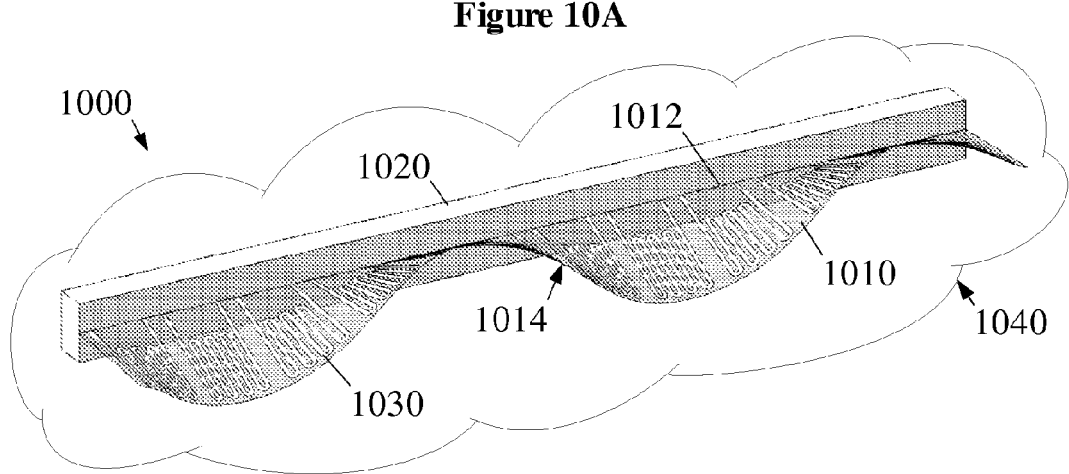
FIG. 10A illustrates a partially transparent perspective view of another structure according to another aspect of the present invention.

FIG. 10A illustrates another structure 1000 according to another aspect of the present invention. The structure 1000 comprises a buckled strip 1010 composed of a thermally activatable shape memory material fixedly, or in alternative embodiments pivotably, connected to a relatively rigid support 1020 along a longitudinal edge 1012. The buckled strip 1010 has a sinuously-shaped profile 1014 viewed from a linear section, which increases in amplitude in a traverse direction from the longitudinal edge 1012. In the illustrated embodiment, the buckled strip 1010 has a sinuously-shaped profile 1014 having two wavelengths, however alternative embodiments may have profiles with a differing number of wavelengths, including non-integer values. The structure 1000 further comprises a plurality of cyclically operable resistive heating elements 1030 embedded in, or in alternative embodiments, attached to a face of the buckled strip 1010. The shape memory of portions of the buckled strip 1010 may be activated in a particular manner by the heating elements 1030 in order to act as work input elements for deforming the buckled strip 1010 in an undulating manner. A fluid 1040 in communication with the buckled strip 1010 acts as a heat sink for locally deactivating the shape memory of the buckled strip 1010 by cooling portions of the buckled strip 1010 not being actively heated by the heating elements 1030. The fluid 1040 may also act as a body upon which the buckled strip 1010 can perform work when it is deformed. Optionally, the heating elements 1030 may be electrically insulated from the buckled strip 1010 as later described with reference to FIG. 21.

Figure 10B:
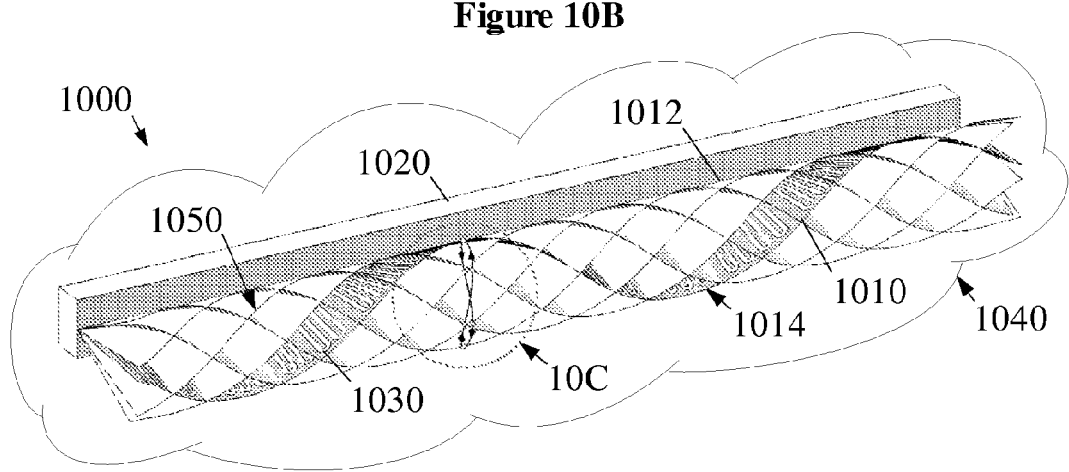
FIG. 10B illustrates movement of the structure shown in FIG. 10A in operation.
Figure 10C:
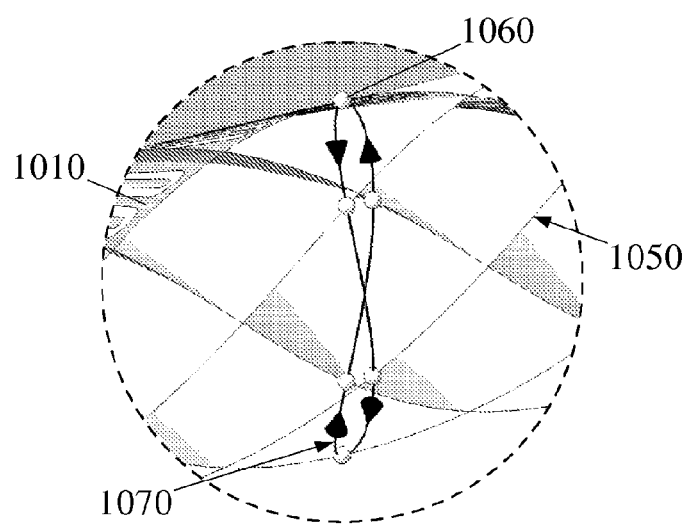
FIG. 10C illustrates an enlarged partial view of FIG. 10B.

FIG. 10B shows movement of the structure 1000 in operation, motion time-series 1050 illustrating the buckled strip 1010 being deformed in an undulating manner. Advantageously, the buckled strip 1010 acts as a fully compliant mechanism by deforming in an undulating manner with distributed compliance, allowing it to operate without sliding joints or the formation of slack. Further advantageously, the buckled state of the buckled strip 1010 allows it to be deformed in an undulating manner with substantially constant net strain energy whereby it may be deformed without appreciable opposition from elastic restoring forces. FIG. 10C is an enlarged partial view of FIG. 10B. Representing motion of one point in a series of points on the sinusoidally-shaped profile 1014 throughout the motion time-series 1050, a marker 1060 travels along a curved out-of-plane, figure eight-shaped path 1070 relative to the support 1020.

Figure 11A:
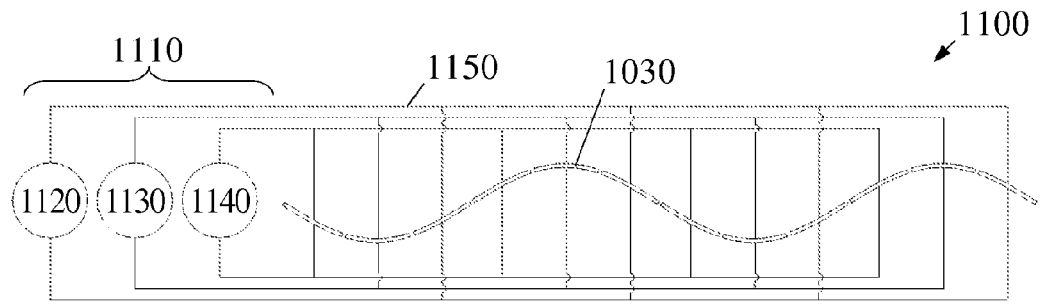
FIG. 11A shows an electrical schematic of the structure shown in FIG. 10A.

FIG. 11A shows an electrical schematic 1100 of the structure 1000. A series of electrical waveforms 1110 provide electrical power to the heating elements 1030, which are depicted in longitudinal profile. It may be noted by examining the buckled strip 1010 that one-third of each half wavelength of its sinuously-shaped profile 1014 is relatively straight compared to the remaining two-thirds. Correspondingly, the heating elements 1030 are configured in the buckled strip 1010 with a spacing of one every one-sixth of a wavelength for producing localised straightening stresses using the shape memory effect so as to enable deformation of the buckled strip 1010 in an undulating manner. The series of electrical waveforms 1110 comprise a first phase 1120, a second phase 1130 and a third phase 1140 for respective electrical connection to the third, second and first heating elements 1030 of each half wavelength of the buckled strip 1010 through electrical connectors 1150.

Figure 11B:
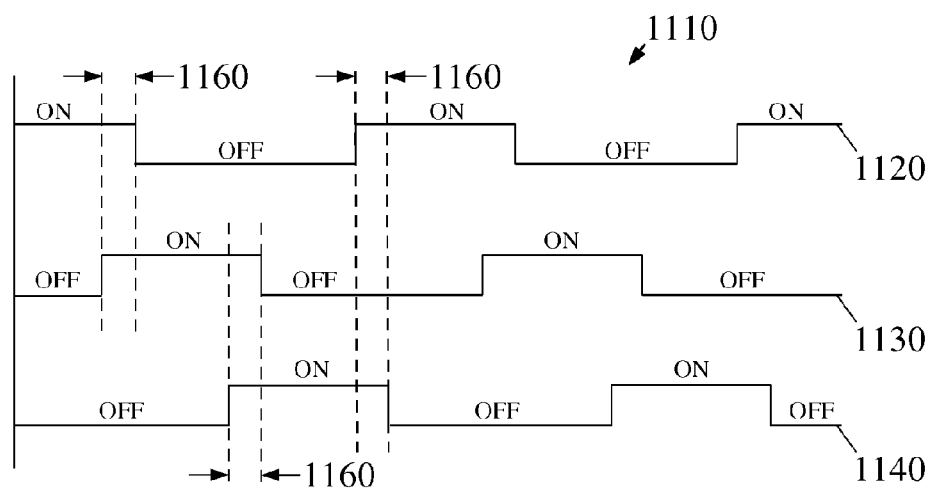
FIG. 11B shows a series of electrical waveforms for driving the structure shown in FIG. 10A.

FIG. 11B shows details of the series of electrical waveforms 1110 for driving the structure 1000. In their most basic form, the phases 1120, 1130 and 1140 of the series of electrical waveforms 1110 operate cyclically in sequence, the order and frequency of which determine the respective direction and speed of undulatory deformation of the buckled strip 1010. Modifications may be made to this basic form of the phases 1120, 1130 and 1140 for various purposes including: maximising energy efficiency, smoothing intercycle power delivery, over-temperature protection, and over-strain protection. Such modifications include, but are not limited to: pulse width modulation, amplitude modulation, and a time variable 1160 for advancing or delaying sequential operation between the phases 1120, 1130 and 1140. In the embodiment of the structure 1000 shown, the series of electrical waveforms 1110 provide open loop control of the buckled strip 1010, but feedback such as temperature or positional feedback may be incorporated for closed loop control.

It will be readily understood that alternative actuation configurations and technologies may be used as work input elements to deform the buckled strip 1010 in an undulating manner. For example, the shape memory of the buckled strip 1010 may be activated by directly passing an electrical current thorough the shape memory material, or by channelling a suitably hot fluid in thermal communication with it. The buckled strip 1010 may have a shape memory such that activation causes a bending rather than straightening action, or may instead be composed of materials other than shape memory materials with activation by other means such as that described below in reference to FIG. 20. The number of heating elements 1030 may be varied to give greater precision of movement or to simplify manufacturing and operation. Furthermore, the heating elements 1030 may be individually controlled to influence the shape of the buckled strip 1010, including within a certain range, the amplitude and wavelength characteristics of its sinuously shaped profile 1014.

The structure 1000 may be used as an undulatory propulsion system by attachment to a watercraft such that the buckled strip 1010 is submersed in water parallel to the intended direction of movement. It will be clear to those skilled in the art that the structure 1000 may also function as an actuator, a sensor, a generator, a fan, a pump, or a loudspeaker in a similar way to the structure 100.

Figure 12:
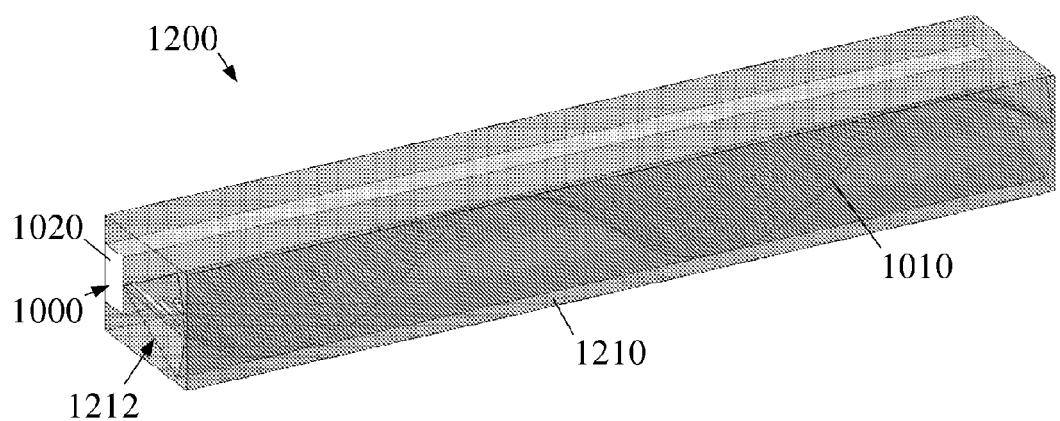
FIG. 12 illustrates a partially transparent perspective view of a hermetically sealed pump according to another aspect of the present invention.

FIG. 12 illustrates a hermetically sealed pump 1200 comprising the structure 1000 and a casing 1210 fixedly connected to the support 1020 of the structure 1000. The casing 1210 is shown transparently to reveal a wedge shaped cavity 1212 therein for accommodating undulatory deformation of the buckled strip 1010 and directing flow of the fluid 1040 (not shown). In alternative embodiments, a leading edge and/or a trailing edge of the buckled strip 1010 may be tapered to reduce drag and minimise the impact of end effects on the shape of the buckled strip 1010.

Figure 13:
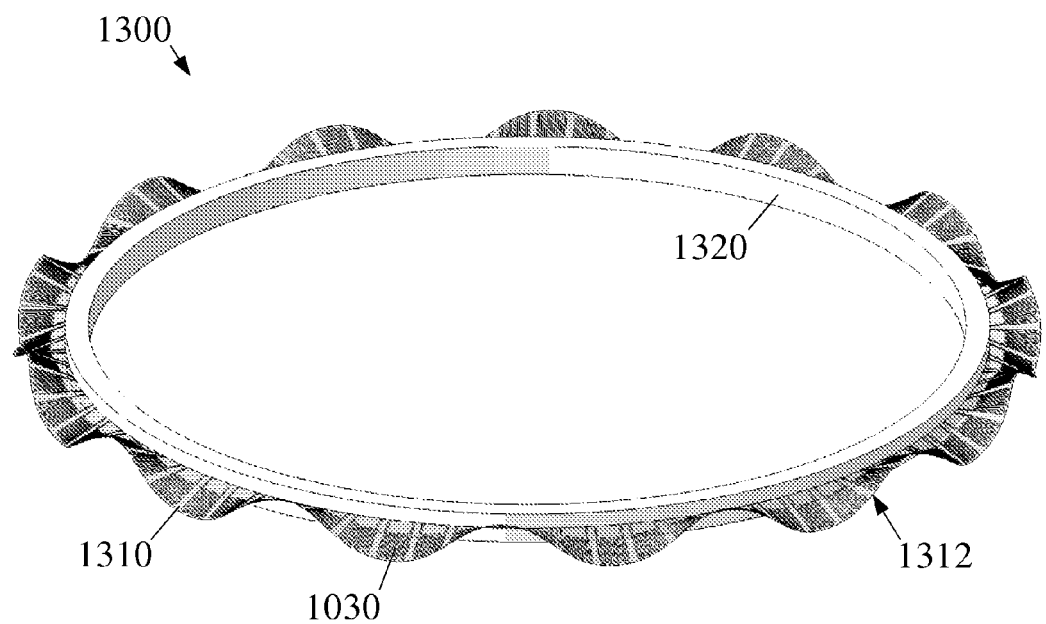
FIG. 13 illustrates a partially transparent perspective view of an agitator according to another aspect of the present invention.

FIG. 13 shows an agitator 1300 comprising a curved buckled strip 1310 composed of a thermally activatable shape memory material, fixedly attached to a relatively rigid curved support 1320. The agitator further comprises a plurality of heating elements 1030 embedded in the curved buckled strip 1310 for acting to deform it in an undulating manner so as to agitate a surrounding fluid (not shown). The agitator 1300 is similar to the structure 1000 except that the curved buckled strip 1310 has a sinuously-shaped profile 1312 viewed from a circumferential section rather than a linear section. In alternative embodiments the curved buckled strip 1310 and the rigid curved support 1320 may be discontinuous and/or have varying curvature wherein the curved buckled strip 1310 has a sinuously-shaped profile 1312 viewed from a curved section.

Figure 14:
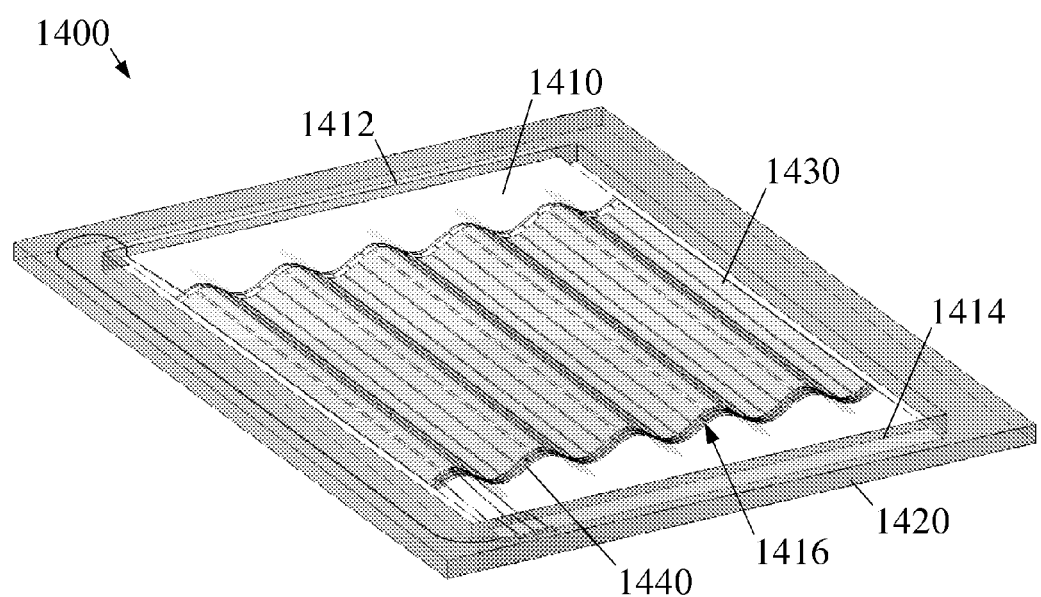
FIG. 14 illustrates a partially transparent perspective view of an acoustic transducer according to another aspect of the present invention.

FIG. 14 shows an acoustic transducer 1400 according to another aspect of the present invention. The acoustic transducer 1400 comprises a buckled sheet 1410 composed of a shape memory material, having a first edge 1412 and an opposing second edge 1414, both first and second edges 1412 and 1414 fixedly connected to a frame 1420. The buckled sheet 1410 is buckled by shear stresses generated by forces imposed by the frame 1420, so as to form a sinuously shaped profile 1416 viewed from a linear section of the buckled sheet 1410. The sinuously shaped profile 1416 has substantially constant amplitude with increasing distance from the first edge 1412, a reduction in amplitude occurring in near vicinity of the first and second edges 1412 and 1414 where the buckled sheet 1410 is connected to the frame 1420. The acoustic transducer 1400 further comprises a plurality of strip heaters 1430 disposed on the buckled sheet 1410 and a series of electrodes 1440 for transmitting electrical power to the strip heaters 1430 in order to activate the shape memory of portions of the buckled sheet 1410. Acoustic energy is generated in a fluid (not shown) in communication with the buckled sheet 1410 by applying a suitable series of electrical waveforms to the series of electrodes 1440 for controlling the rate of deformation of the buckled sheet 1410 in an undulating manner wherein each point in a series of points on the sinuously-shaped profile 1416 travels at least partially along a figure eight-shaped path relative to the frame 1420.

While the buckled sheet 1410 is buckled by shear stresses generated by forces exerted by the frame 1420, many other configurations and arrangements known in the art for causing a sheet to buckle may be employed in alternative embodiments of the acoustic transducer 1400; for example, an arrangement that uses forces exerted by an elastic substrate to buckle a strip is described in Physical Review E Vol. 75 No. 1 (2006) pp. 016609 (Concha et al.). The buckled sheet 1410 exhibits a buckling pattern of straight stripes, but in the alternative embodiments of the acoustic transducer 1400, the buckled sheet 1410 may exhibit different buckling patterns also having a sinuously-shaped profile that may be deformed in an undulating manner, including patterns described as checkerboard, undulating stripes and herringbone. As some of these buckling patterns have biaxial sinuously-shaped profiles, it may be possible to deform the buckled sheet 1410 in a manner where undulatory deformation can occur in different directions.

FIGS. 15A, 16A, 17A and 18 show embodiments of the present invention wherein a strip is maintained in a buckled form having a sinuously-shaped profile by mechanisms that dynamically constrain one or more degrees of freedom of at least two points on its sinuously-shaped profile relative to each other. In each of these embodiments, the strip may be deformed in an undulating manner by work input elements acting on the mechanisms that constrain points on the profile of the strip in order for the strip to perform work on a surrounding fluid. However, work input elements may act in other ways on the strip, in which case the mechanisms that constrain points on the profile of the strip may function as bodies on which the strip performs work.

Figure 15A:
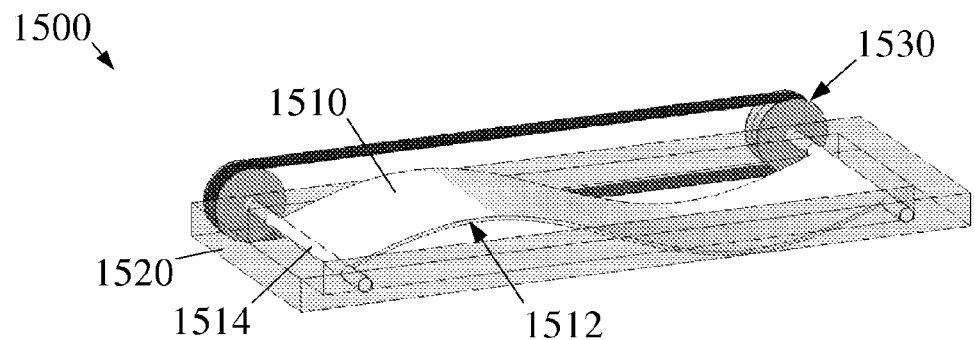
FIG. 15A illustrates a partially transparent perspective view of a rotation constrained undulatory device according to another aspect of the present invention.

FIG. 15A illustrates a rotation constrained undulatory device 1500 comprising a buckled strip 1510 having a sinuously-shaped profile 1512, rigidly and axially connected to a pair of rotatable shafts 1514 along its longitudinal edges. The rotatable shafts 1514 are rotatably connected to a frame

1520 and are connected to a belt-pulley mechanism 1530 for constraining their rotation relative to each other.

Figure 15B:
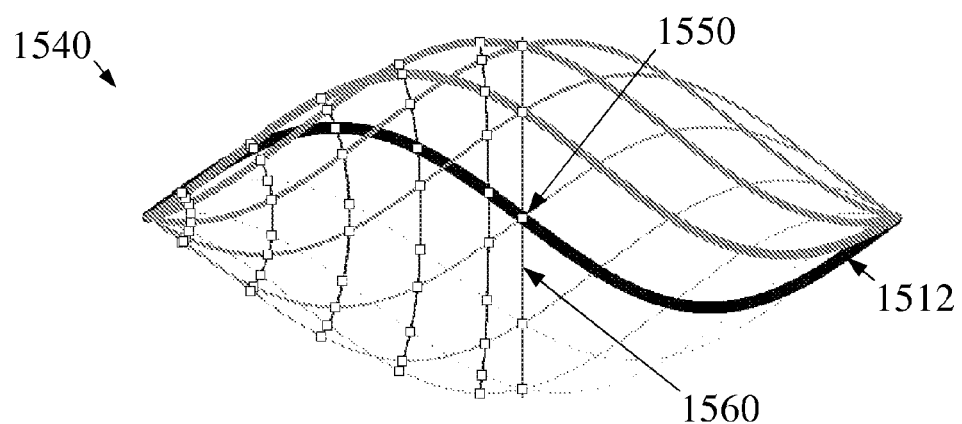
FIG. 15B illustrates operational movement of the rotation constrained undulatory device of FIG. 15A in side view.

Illustrating movement of the rotation constrained undulatory device 1500 in operation, FIG. 15B shows a motion diagram 1540 of the sinuously-shaped profile 1512 as the buckled strip 1510 is deformed in an undulating manner. A series of points 1550 on the sinuously-shaped profile 1512 travel respective paths 1560 as the buckled strip 1510 deforms. A characteristic of the deformation of the buckled strip 1510 that will become apparent with reference to FIGS. 16B and 17B is that each point in the series of points 1550 travels a figure eight-shaped path relative to a common frame of reference seen from the frame 1520 moving in a path congruent with the figure eight-shaped path travelled by each point.

Figure 15C:
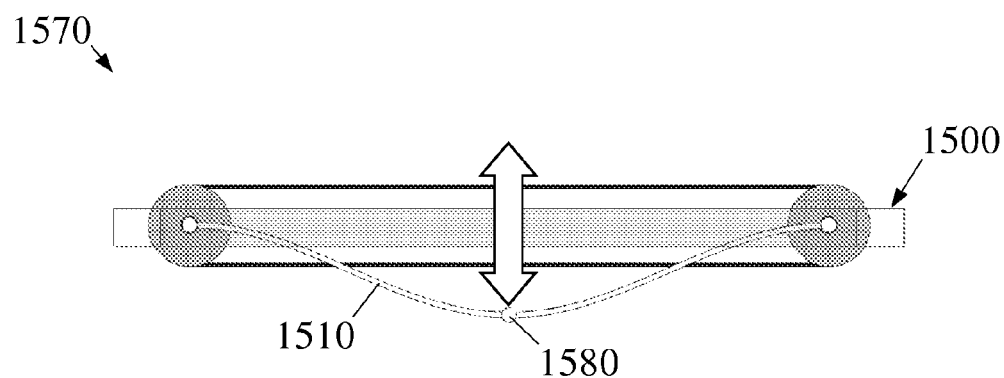
FIG. 15C shows a side view of a direct-coupled actuator utilising the rotation constrained undulatory device of FIG. 15A.

Like the linear transducer 300, the rotation constrained undulatory device 1500 may be direct-coupled to a solid body to perform work on it. FIG. 15C shows a direct-coupled actuator 1570 comprising the rotation constrained undulatory device 1500 and a direct coupler 1580 fixed to the buckled strip 1510. Deformation of the buckled strip 1510 in an undulating manner generates motion of the direct coupler 1580, which in preferred embodiments is linear motion due the direct coupler 1580 being centrally located on the buckled strip 1510.

Figure 16A:
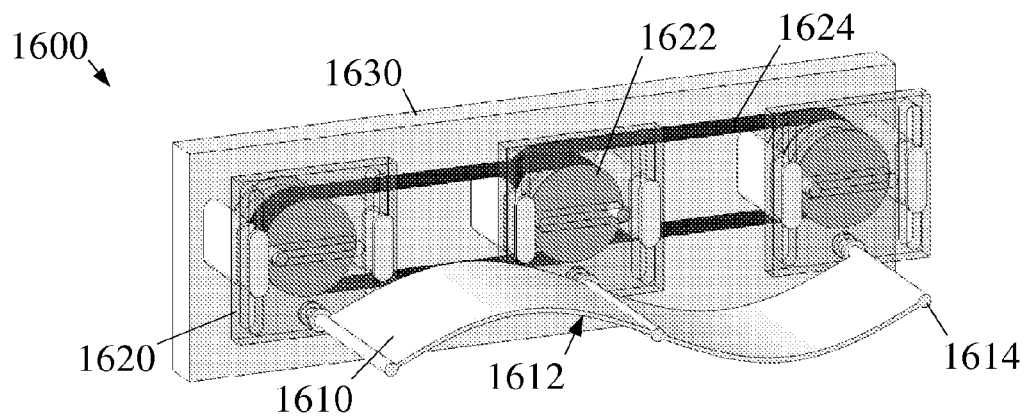
FIG. 16A illustrates a partially transparent perspective view of a translation constrained undulatory device according to another aspect of the present invention.

FIG. 16A illustrates a translation constrained undulatory device 1600 comprising a buckled strip 1610 having a sinuously-shaped profile 1612. Translatable shafts 1614 are axially aligned with, and rigidly connected to the longitudinal edges and longitudinal midline of the buckled strip 1610. The translatable shafts 1614 are pivotably connected to sliders 1620, which form scotch yoke mechanisms by translatable connection to a support member 1630 and pulley cams 1622 in an orthogonal manner. The pulley cams 1622 are rotatably connected to the support member 1630 and rotatably constrained relative to each other by belts 1624 for constraining the translation of the translatable shafts 1614 relative to each other.

Figure 16B:
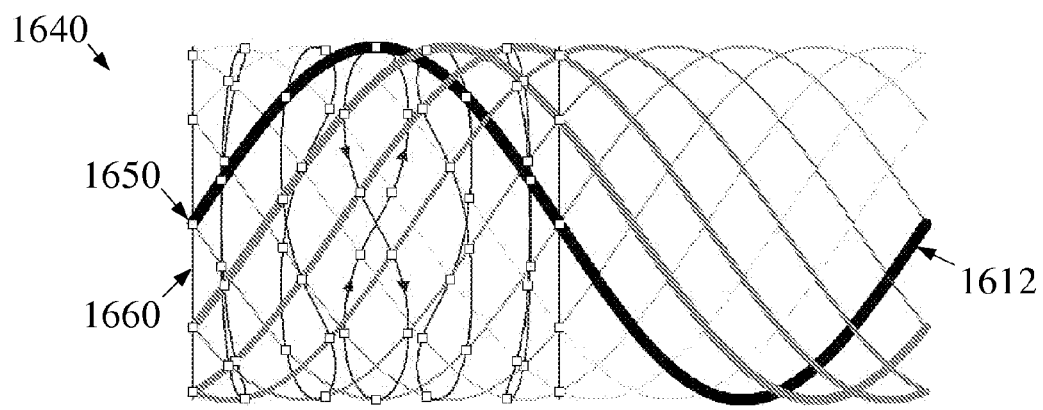
FIG. 16B illustrates operational movement of the translation constrained undulatory device of FIG. 16A in side view.
Figure 16C:
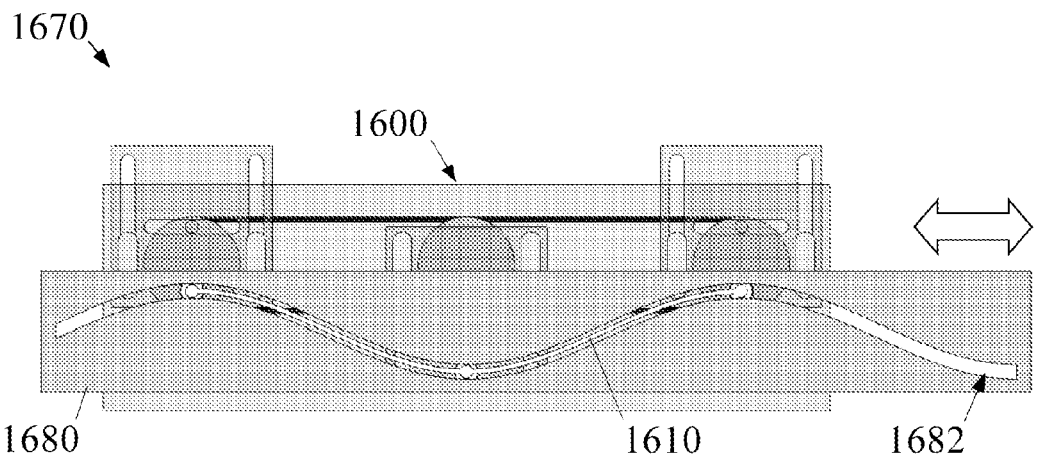
FIG. 16C shows a side view of a shape-coupled actuator utilising the translation constrained undulatory device of FIG. 16A.

Illustrating movement of the translation constrained undulatory device 1600 in operation, FIG. 16B shows a motion diagram 1640 of the sinuously-shaped profile 1612 as the buckled strip 1610 is deformed in an undulating manner. A series of points 1650 on the sinuously-shaped profile 1612 travel respective paths 1660 as the buckled strip 1610 deforms. A characteristic of the deformation of the buckled strip 1610 that will become more apparent with reference to FIG. 17B is that each point in the series of points 1650 travels a figure eight-shaped path relative to a common frame of reference seen from the support member 1630 moving in a path congruent with the horizontal component of the figure eight-shaped path travelled by each point The translation constrained undulatory device 1600 may be direct-coupled to a solid body to perform work on it, or may be coupled by the shape of its sinuously-shaped profile 1612 similar to the heat engine 600. FIG. 16C shows a shape-coupled actuator 1670 comprising the translation constrained undulatory device 1600 and a shape coupler 1680 having a sinuously-shaped slit 1682 slidingly and meshingly engaged with the buckled strip 1610. Rotation of pulley cams 1622 causes linear motion of the shape coupler 1680, or in reverse, linear motion of the shape coupler 1680 causes rotation of pulley cams 1622.

Figure 17A:
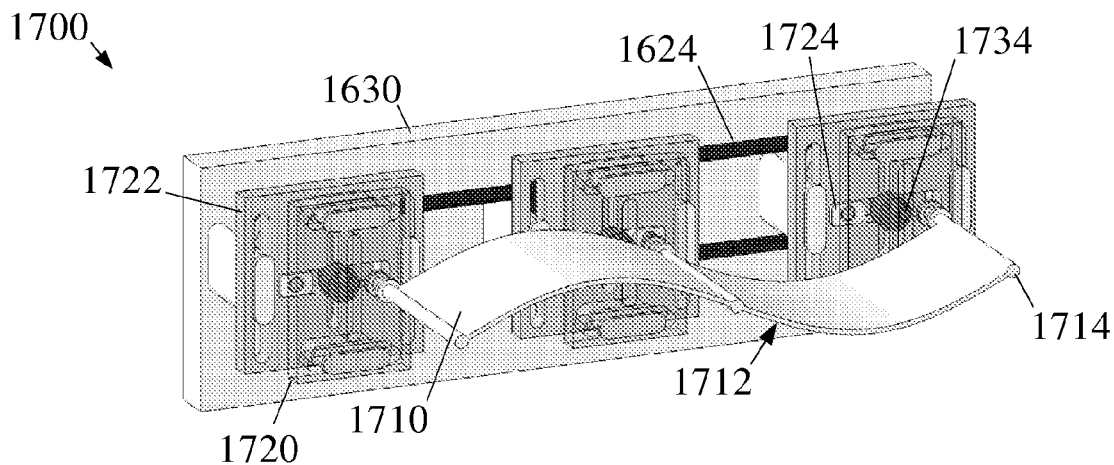
FIG. 17A illustrates a partially transparent perspective view of a figure eight constrained undulatory device according to another aspect of the present invention.
Figure 17B:
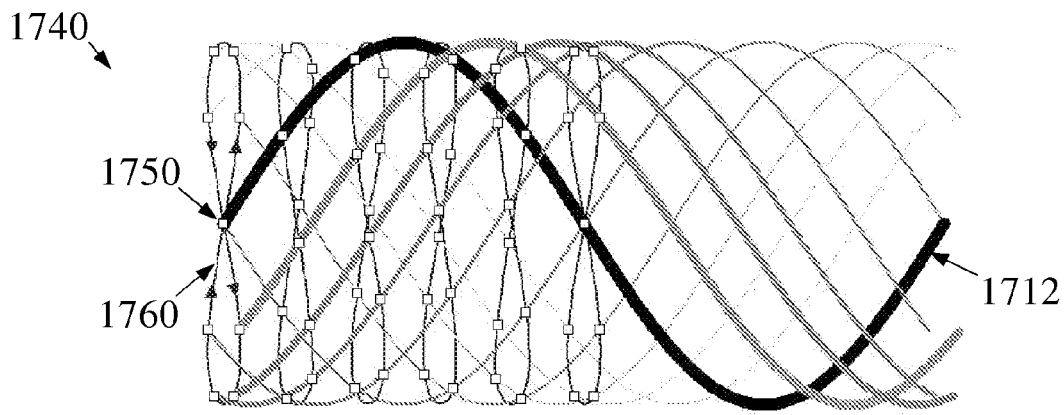
FIG. 17B illustrates operational movement of the figure eight constrained undulatory device of FIG. 17A in side view.

FIG. 17A illustrates a figure eight constrained undulatory device 1700 similar to the translation constrained undulatory device 1600, but having an additional series of scotch yoke mechanisms. The figure eight constrained undulatory device 1700 comprises a buckled strip 1710 having a sinuously-shaped profile 1712. Dynamic shafts 1714 are axially aligned with, and rigidly connected to the longitudinal edges and longitudinal midline of the buckled strip 1710. The dynamic shafts 1714 are pivotably connected to horizontal sliders 1720, which form horizontal acting scotch yoke mechanisms by translatable connection to the vertical sliders 1722 and cams 1734 in an orthogonal manner. In turn, the vertical sliders 1722 form vertically acting scotch yoke mechanisms by translatable connection in an orthogonal manner to the support member 1630 and pulley cams 1622 (obscured by the vertical sliders 1722) via pivotably connected guides 1724. The cams 1734 are rotatably connected to the pulley-cams 1622 via a 2:1 ratio internal gear set (not shown) such that the horizontal sliders 1720, and consequently, the dynamic shafts 1714 travel figure eight-shaped paths relative to the support member 1630. The pulley cams 1622 are rotatably connected to the support member 1630 and rotatably constrained relative to each other by belts 1624 for constraining the figure eight-shaped paths of the dynamic shafts 1714 relative to each other.

Illustrating movement of the figure eight constrained undulatory device 1700 in operation, FIG. 17B shows a motion diagram 1740 of the sinuously-shaped profile 1712 as the buckled strip 1710 is deformed in an undulating manner. A series of points 1750 on the sinuously-shaped profile 1712 travel respective paths 1760 as the buckled strip 1710 deforms. It can be seen that each point in the series of points 1650 travels a figure eight-shaped path relative to the support member 1630.

Figure 17C:
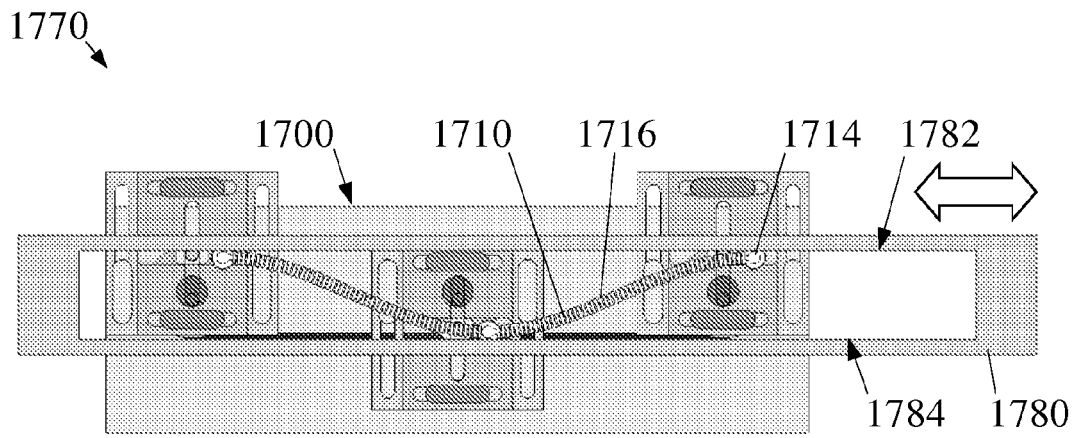
FIG. 17C shows a side view of a friction-coupled actuator utilising the figure eight constrained undulatory device of FIG. 17A.

The figure eight constrained undulatory device 1700 may be direct-coupled or shape-coupled to a solid body to perform work on it, or instead may be coupled by friction similar to the friction-coupled rotary actuator 900. FIG. 17C shows a friction-coupled actuator 1770 comprising the figure eight constrained undulatory device 1700 modified with a series of compliant feet 1716 attached to the buckled strip 1710 for increasing friction and providing clearance for the dynamic shafts 1714. The friction-coupled actuator 1770 further comprises a friction coupler 1780 having an upper internal surface 1782 and an opposing lower internal surface 1784 for frictionally engaging the compliant feet 1716. Deformation of the buckled strip 1710 in an undulating manner imparts a cooperatively acting tangential motion on the compliant feet 1716 in contact with the upper and lower internal surfaces 1782 and 1784 so as to move the buckled strip 1710 simultaneously on the upper and lower internal surfaces 1782 and 1784 in a rolling-like motion. Anti-rotation guides (not shown) prevent rotation of the friction coupler 1780 by constraining it to a translational path. In alternative embodiments, the anti-rotation guides may be omitted if the friction coupler is sufficiently supported through the use of at least one additional figure eight constrained undulatory device 1700, or a buckled strip 1710 having a sinuously-shaped profile 1712 with multiple wavelengths.

Motion of the buckled strips 1510, 1610 and 1710 may bifurcate into apparent forward or backward travelling waves at two opposing positions in an undulatory cycle when deformed in an undulating manner by the mechanisms that provide dynamic constraints in each device. In alternative embodiments of the devices 1500, 1600 and 1700, an additional mechanism may be provided to dynamically constrain an additional point on the respective buckled strips 1510, 1610 and 1710 in order to provide deterministic motion thereof, thereby extending the suitability of the devices 1500, 1600 and 1700 to applications where more than half a continuous undulatory cycle is required and the apparent direction of undulation is important. While dynamically constraining the path of an additional point on the buckled strips 1510 and 1610 involves additional complexity, constraining an additional point on the buckled strip 1710 can be simply achieved by adding an appropriately phase-adjusted double scotch yoke mechanism due to congruence of the paths 1760. Instead of fully constraining motion of an additional point on the buckled strips 1510, 1610 and 1710, biasing mechanisms such as springs, guides or secondary actuators may be configured to act on the buckled strips 1510, 1610 and 1710 in order to provide deterministic motion thereof.

Figure 18:
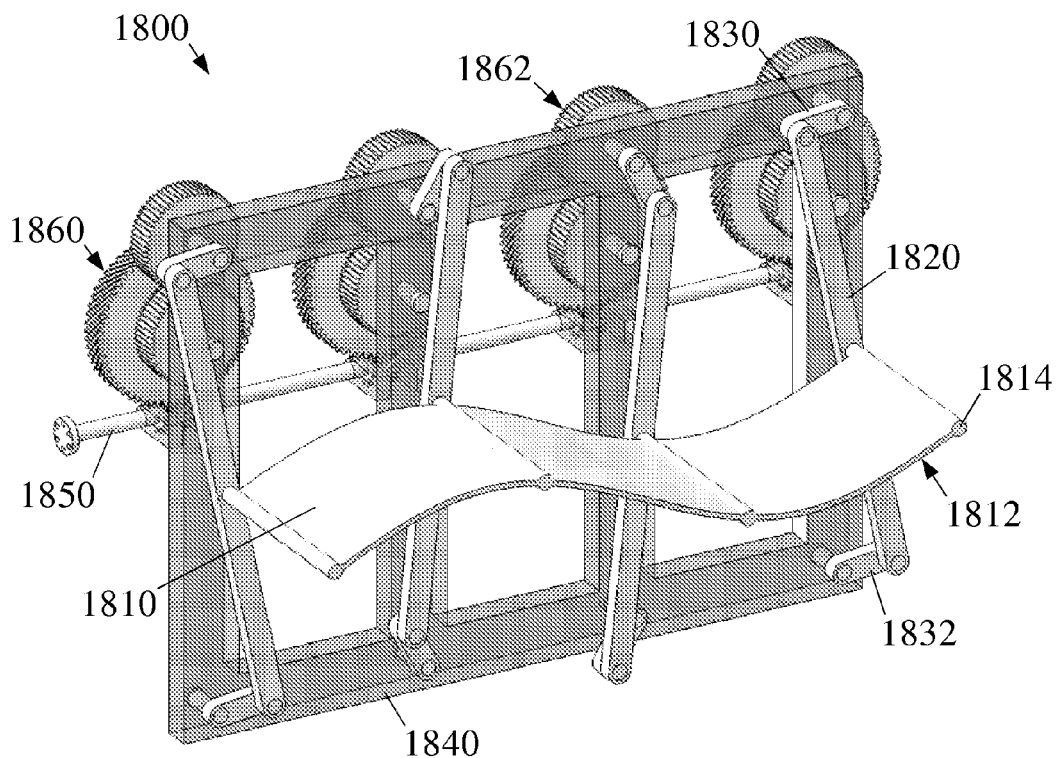
FIG. 18 illustrates a partially transparent perspective view of an undulatory propulsion system according to another aspect of the present invention.

It will be appreciated that a variety of mechanisms may be used to dynamically maintain a sheet in buckled form. With reference to the figure eight constrained undulatory device 1700, four-bar linkages may be substituted for the double scotch yoke mechanisms to generate the figure eight-shaped paths 1760, and gears, mechanical linkages or electronically controlled actuators may be substituted for the belts 1624. FIG. 18 shows an undulatory propulsion system 1800 illustrating a gear coupled, four-bar linkage design that constrains motion of points on a buckled strip to coupled figure eight-shaped paths. The undulatory propulsion system 1800 comprises a buckled strip 1810 having a sinuously-shaped profile 1812, and dynamic shafts 1814 axially aligned with, and rigidly connected to the longitudinal edges and two intermediate positions of the buckled strip 1810. The dynamic shafts 1814 are rigidly, or in alternative embodiments, pivotably connected to connecting bars 1820, which are rotatably connected at one end to first crank arms 1830 and rotatably connected at an opposing end to second crank arms 1832. The first and second crank arms 1830 and 1832 are rotatably connected to a mounting structure 1840, the first crank arms 1830 connected to a drive shaft 1850 by worm gear sets 1860 and non-circular gear sets 1862, which are also rotatably connected to the mounting structure 1840. In order to deform the buckled strip 1810 in an undulating manner with substantially constant net strain energy, the non-circular gear sets 1862 are shaped to produce biaxial sinusoidal motion of the dynamic shafts 1814 when the drive shaft 1850 is rotated at a constant speed.

While the buckled strip 1810 is sufficiently constrained to have deterministic motion, the rotational direction of each of the second crank arms 1832 may bifurcate when vertically aligned with the respective first crank arms 1830. Elastic forces exerted by the buckled strip 1810 act to prevent rotation bifurcation of the second crank arms 1832, but in alternative embodiments, the first crank arms 1830 and second crank arms 1832 may be further coupled with non-circular gear sets, or to obviate the need for any non-circular gear sets, with conventional differential gear sets.

Advantageously, the undulatory propulsion system 1800 is capable of transmitting constant power over an undulatory cycle due to the number and spacing of the dynamic shafts 1814 on the sinuously-shaped profile 1812 of the buckled strip 1810, and because the two outermost dynamic shafts 1814 see half the load presented by a surrounding fluid relative to the two innermost dynamic shafts 1814. Another advantage of the undulatory propulsion system 1800 is that the buckled strip 1810 is deformable in an undulating manner without multiple actuators and complex control systems, needing only rotational power input at the drive shaft 1850.

Figure 19:
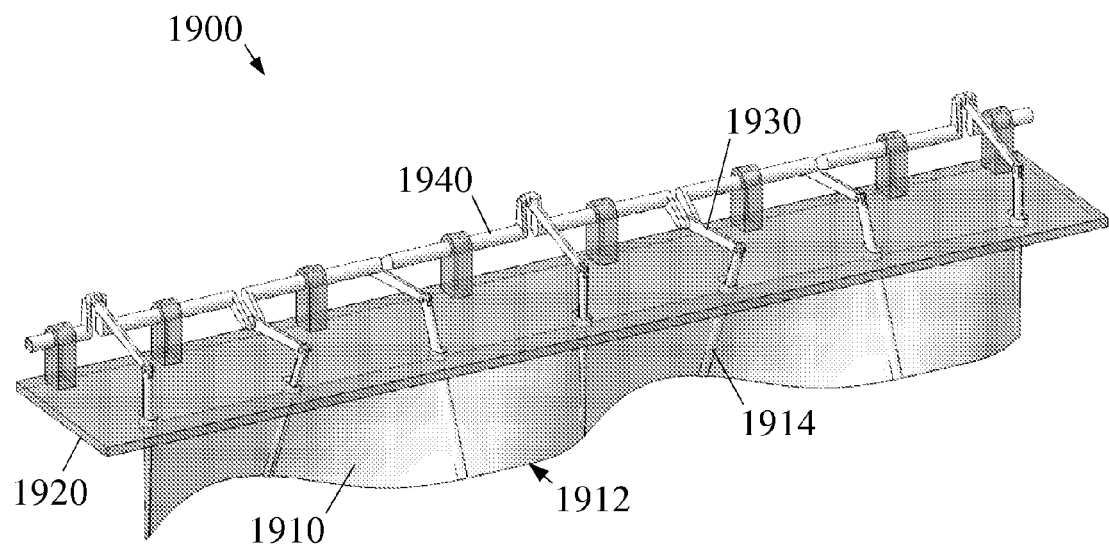
FIG. 19 illustrates a partially transparent perspective view of an undulatory thruster according to another aspect of the present invention.

FIG. 19 illustrates an undulatory thruster 1900 similar to the structure 1000 but mechanically driven like the undulatory propulsion system 1800. The undulatory thruster 1900 comprises a fin-like buckled sheet 1910 having a sinuously-shaped profile 1912, fixedly connected along a longitudinal edge to a backing structure 1920 and fixedly connected along its width at longitudinal intervals to struts 1914 adjacent to one end thereof. The struts 1914 are pivotably connected at an intermediate position to the backing structure 1920 in-line with where the buckled sheet 1910 is connected, and pivotably connected at another end to one end of respective connecting rods 1930. The connecting rods 1930 are rotatably connected at another end to a crankshaft 1940, whereby rotation of the crankshaft 1940 causes the struts 1914 to exert lateral forces on the buckled sheet 1910 that act to deform it in an undulating manner wherein each point in a series of points on its sinuously-shaped profile 1912, travels a figure eight-shaped path. The longitudinal component of the figure eight-shaped path can be attributed to the compressional stiffness of the buckled sheet 1910 and is accommodated for in the struts 1914 by movement in the joints of the connecting rods 1930.

While the crankshaft mechanism used in the undulatory thruster 1900 has a relatively low part count, it does not cause the buckled sheet 1910 to be deformed along a neutrally stable path due to non-sinusoidal oscillation of the struts 1914. The resulting imbalance of elastic forces developed in the buckled sheet 1910 as it is deformed imposes an oscillatory torque on the crankshaft 1940, the effects of which may be suppressed by attaching a flywheel to the crankshaft 1940 or by providing a counterbalancing oscillatory torque. Other mechanism designs may of course be used in alternative embodiments of the undulatory thruster 1900 for deforming the buckled sheet 1910 in an undulating manner, which may reduce oscillatory torque on the crankshaft 1940 by providing oscillation of the struts 1914 in a more sinusoidal manner.

Figure 20:
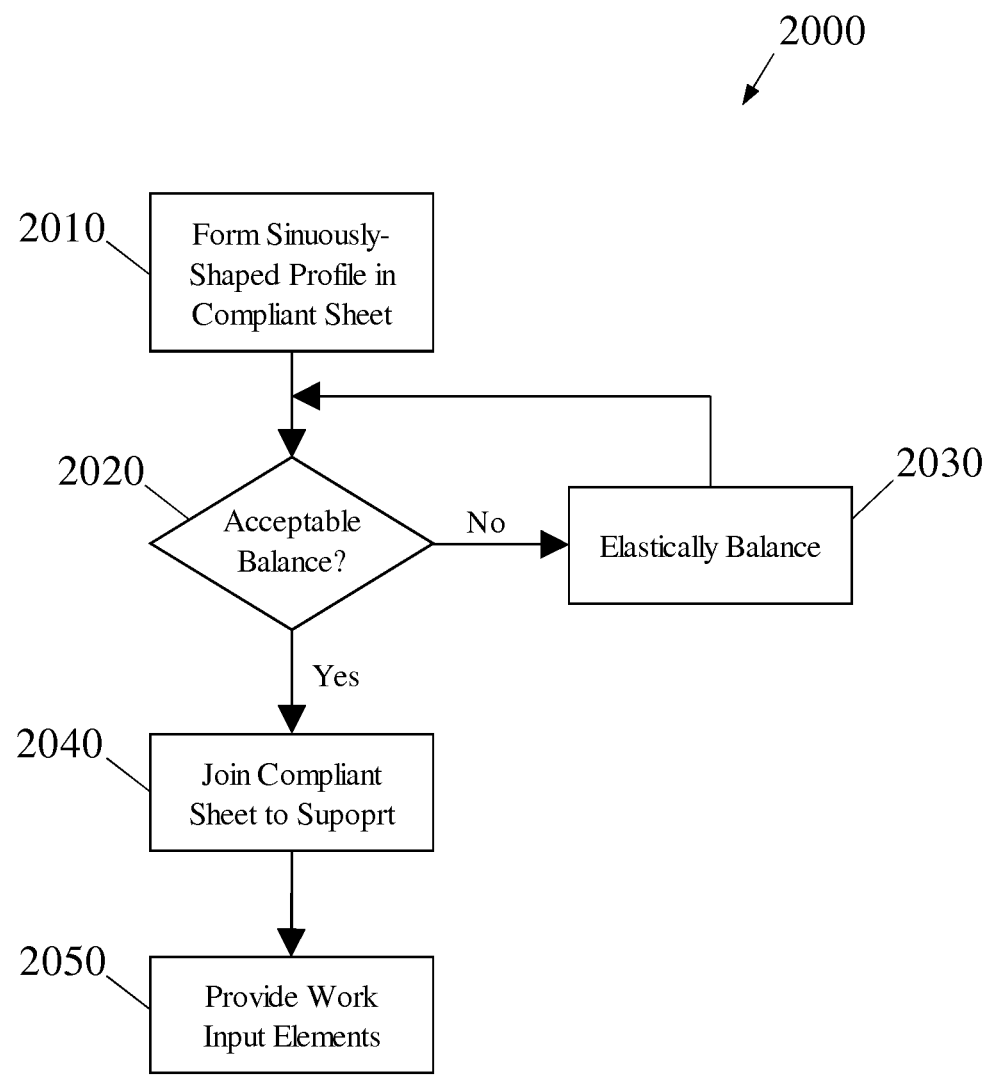
FIG. 20 is a general flow diagram of a method of fabricating a structure according to another aspect of the present invention.

FIG. 20 is a general flow diagram of a method 2000 of fabricating a structure according to another aspect of the present invention. The method 2000 includes the step 2010 of forming a sinuously-shaped profile in a compliant sheet by inducing buckling stresses therein. Typically the compliant sheet has a maximum dimension of between 2 cm and 2 m; however, embodiments of the present invention may also be useful at much smaller and much larger scales, for example as micropumps or ship propulsors.

The compliant sheet used in step 2010 may be composed of any suitable self-supporting material, which in general is one having an elastic limit sufficient to prevent plastic deformation or failure from combined buckling and actuation stresses. Other material selection considerations may include fatigue resistance, elastic hysteresis, stress relaxation characteristics and creep characteristics, as well as resistance to chemicals, corrosion, wear and temperature extremes. By way of example and not limitation of materials that may be used, the buckled sheet 110 of the structure 100 may be paper or plastic, the buckled sheets 612 and annular strips 613 of the heat engine 600 may be iron, copper, nickel or titanium based alloys, and the buckled sheet 1910 of the undulatory thruster 1900 may be a fiber-reinforced elastomer. In general, the compliant sheet has constant thickness and is initially flat and unstressed, however, variations may be engineered to influence its stability characteristics in a buckled configuration. Preferably, the compliant sheet has isotropic mechanical properties to simplify balancing of elastic forces, however, anisotropic properties may be useful for inducing buckling stresses in the compliant sheet.

In order to perform step 2010, buckling stresses may be induced in the compliant sheet by forces exerted on it by stressing members. Such stressing members may be static like the frame 1420 of the acoustic transducer 1400 or dynamic like the dynamic shafts 1814 of the undulatory propulsion system 1800. Activatable stressing members may also be incorporated with the compliant sheet for causing it to buckle, or to alter the stability of a particular buckled configuration. Inducing buckling stresses in the compliant sheet only when it is required for operation may be advantageous when the compliant sheet is constructed from materials in which elastic balance degrades over time when left stationary due to creep or stress relaxation. Alternatively or additionally, the compliant sheet may be buckled by residual stresses induced in it by forming or fabrication processes.

Figure 21:
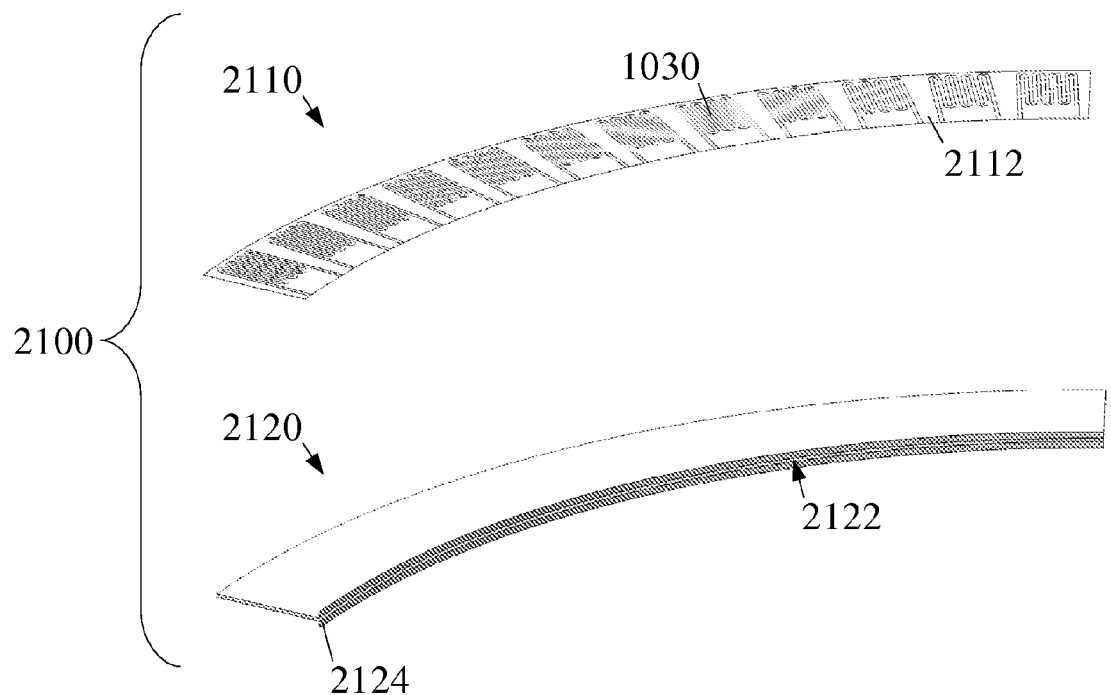
FIG. 21 illustrates a perspective view of components for fabricating the structure of FIG. 10A according to one embodiment of the method illustrated in FIG. 20.

Showing a compliant sheet before buckling forces are exerted on it by a static stressing member to perform step 2010, FIG. 21 illustrates components 2100 that can be used for fabricating the structure 1000. The components include a heater sub-assembly 2110 and a preform 2120 that becomes the buckled strip 1010. The heater sub-assembly 2110 is a flexible strip heater comprising resistive heating elements 1030 encased in a thermally conductive, electrically insulating outer layer 2112. The preform 2120 is composed of a shape memory material, shape set to the shape of a flat annular sector, and includes a pocket 2122 for the heater sub-assembly 2110 to be inserted and fixed, and a lip 2124 for fixedly connecting the preform 2120 to the support 1020. Buckling stresses in the preform 2120 are generated due to a difference in curvature between the lip 2124 and the relatively stiff support 1020 to which it is fixed.

Figure 22:
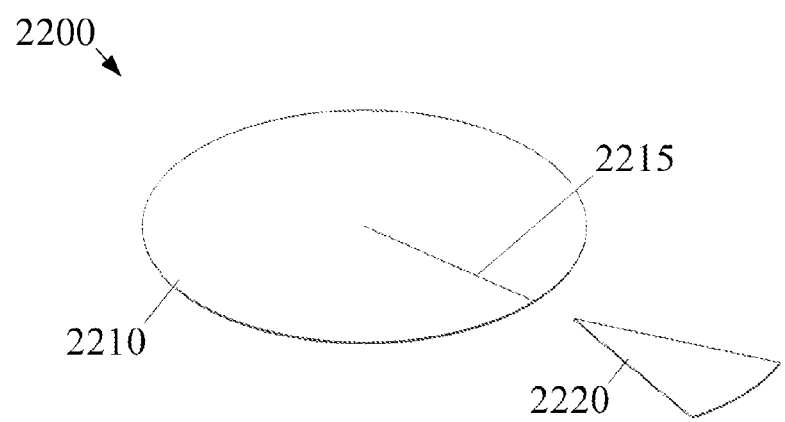
FIG. 22 illustrates a perspective view of components for fabricating the structure of FIG. 1A according to another embodiment of the method illustrated in FIG. 20.

Showing a compliant sheet before it is subjected to a fabrication process for inducing residual stresses in it to perform step 2010, FIG. 22 illustrates components 2200 that can be used for fabricating the buckled sheet 110. The components 2200 include a slit disk 2210 having a radial slit 2215, and a sector 2220 for being joined at each radial edge to opposing edges of the radial slit 2215, whereby the compliant sheet is circumferentially compressed. Preferably, the slit disk 2210, and the sector 2220 are joined as homogeneously as possible to avoid discontinuities in geometry and material properties that could weaken the structure and obstruct fine elastic balance. Even more preferably, the buckled sheet 110 is fabricated without joins by inducing circumferential or radial residual stresses in a flat disk using methods that include mechanical, thermal, chemical and electromagnetic forming processes so as to generate compression in an outer annular area of the disk. Mechanical forming processes suited to circumferentially stretching an outer annular section of the flat disk for this purpose include: rolling; planishing; non-conventional spinning wherein the flat disk is rotated at a speed sufficient for aeroelastic flutter to cause plastic deformation; and peening, including hammer peening, shot peening, laser peening, and dot peening. It will be appreciated that many of these forming processes may be applied more generally for fabricating structures of the present invention; the buckled strip 1010 for example, may be formed from a flat straight strip by peening with increasing intensity from a distance from longitudinal edge 1012 so as to induce residual buckling stresses.

Residual buckling stresses may also be induced in a compliant sheet during fabrication of the sheet. For example, compliant sheets crocheted out of yarn that are buckled by varying the number of stitches in successive rows are described in the Mathematical Intelligencer Vol. 23 No. 2 (2001) 1337-1359 (Henderson et al.) as constructions of the hyperbolic plane. Skilled persons will appreciate how the method described may be applied to other fabrication processes such as knitting, weaving and knotting. Another way of inducing residual buckling stresses in a compliant sheet is to utilise anisotropic properties of the compliant sheet as is known in the art relating to unsymmetric composite laminates. It may also be possible to induce residual buckling stresses in a compliant sheet of a moldable material such as paper pulp or plastic, by causing a sinuously-shaped profile in the moldable material to undulate as it is hardened by a process of drying, curing, cooling or the like.

Following the step 2010 of forming a sinuously-shaped profile in a compliant sheet, the method 2000 of fabricating a structure may optionally include the step 2020 of checking the compliant sheet for acceptable elastic balance. Preferably, elastic balance checks are performed by measuring the force required to deform the compliant sheet in an undulating manner to various positions, but could also be performed by other methods such as a vibration analysis of the compliant sheet while it is deformed in an undulating manner. Typically, the targeted state of elastic balance is a state of neutral stability such that the compliant sheet is undulatable without appreciable opposition from elastic restoring forces. In some cases however, it may be desirable for the compliant sheet to have a variable strain energy profile that may include one or more stable positions. For example, elastic restoring forces exerted on the slider 310 of the linear transducer 300 could be customised as a function of its position.

If the state of stability of the compliant sheet determined by step 2020 is not acceptable, the step 2030 of elastic balancing may be performed. Elastic balancing may be achieved in a number of ways including: altering the distribution of external forces acting on the compliant sheet; altering the distribution of residual stresses in the compliant sheet; locally altering the geometric stiffness of the compliant sheet; and locally altering material stiffness of the compliant sheet.

Optionally, the method 2000 of fabricating a structure includes the step 2040 of joining the compliant sheet to a support for controlling the deformation path of the compliant sheet relative to its environment, and in some cases for transmitting mechanical energy. Compensation in the elastic balance of the compliant sheet may be required in cases where a hole is cut in the compliant sheet to accommodate the support, however in other cases such as the structure 100, a central hole may be cut in the buckled sheet 110 without substantially altering its form or stability characteristics.

The method 2000 of fabricating a structure further includes the step 2050 of providing work input elements in communication with the compliant sheet for deforming its sinuously-shaped profile in an undulating manner. In general, the work input elements are actuators for locally stressing the compliant sheet to cause undulatory deformation, however undulatory motion may also be generated by locally altering the geometric stiffness or material stiffness of the compliant sheet. Actuators may join between the compliant sheet and an external support, may be connected between two points on the compliant sheet, may act on the compliant sheet in a distributed manner, or may form the compliant sheet themselves. The actuators may be arranged to couple primarily with longitudinal or circumferential bending of the compliant sheet, but could alternatively be arranged to couple with lateral or radial bending of the compliant sheet, or a combination thereof. Skilled persons will appreciate that many alternative actuator types and configurations may be employed as work input elements for causing at least partial undulation of the compliant sheet. Suitable actuators may include, without limitation: electromagnetic, electrostatic, hydraulic, pneumatic, thermal bimaterial, piezoelectric, electroactive polymer, shape memory material, magnetostrictive and electrostrictive actuators.

Throughout the drawings, projected gridlines have been shown on perspective views of saddle-shaped buckled sheets to emphasise their curvature and do not indicate edges or form part of the invention.

Throughout the specification, the aim has been to describe the invention without limiting the invention to any one embodiment or specific collection of features. Persons skilled in the relevant art may realise variations from the specific embodiments that will nonetheless fall within the scope of the invention.

The invention claimed is:

1. A structure comprising:
    a buckled sheet having a sinuously-shaped profile; and
    one or more work input elements in communication with the buckled sheet for deforming the buckled sheet in an undulating manner wherein each point in a series of points on the sinuously-shaped profile travels at least partially along a figure eight-shaped path relative to a common frame of reference.

2. The structure of claim 1, wherein the buckled sheet comprises a material having isotropic mechanical properties.

3. The structure of claim 1, wherein the sinuously-shaped profile is sinusoidally shaped.

4. The structure of claim 1, wherein the sinuously-shaped profile viewed from a section of the buckled sheet has a shape selected from the group consisting of: circumferential, linear, and curved.

5. The structure of claim 1, wherein the sinuously-shaped profile has an amplitude that is characterised in a direction extending normally from the section in a way selected from the group consisting of: substantially constant, monotonic, and sinuously-varying.

6. The structure of claim 1, wherein the buckled sheet is saddle-shaped.

7. A structure, comprising:
    a buckled sheet having a saddle point and a periphery, wherein a section of the buckled sheet adjacent to the saddle point has a saddle shape; and
    one or more work input elements connected to the section of the buckled sheet having a saddle shape for acting to rotatably reorientate the saddle shape of the section in relation to the saddle point by deforming the buckled sheet,
    wherein each point in a series of points on the periphery travels at least partially along a figure eight-shaped path relative to the saddle point.

8. The structure of claim 1 wherein the buckled sheet is deformable in an undulating manner with substantially constant net strain energy, whereby the buckled sheet may be deformed without appreciable opposition from elastic restoring forces.

9. The structure of claim 7 wherein the buckled sheet is deformable in an undulating manner with substantially constant net strain energy, whereby the buckled sheet may be deformed without appreciable opposition from elastic restoring forces.

10. The structure of claim 1, wherein the structure is in the form of one of the following: a transducer; an actuator; a sensor; a generator; a fan; a pump; a loudspeaker; a heat engine; and a propulsion system.

11. The structure of claim 7, wherein the structure is in the form of one of the following: a transducer; an actuator; a sensor; a generator; a fan; a pump; a loudspeaker; a heat engine; and a propulsion system.

12. The structure of claim 1, wherein the structure is a machine for performing work on one or more bodies in communication with the machine, whereby the buckled sheet performs work on the one or more bodies as a result of being deformed in an undulating manner.

13. The structure of claim 7, wherein the structure is a machine for performing work on one or more bodies in communication with the machine, whereby the buckled sheet performs work on the one or more bodies as a result of being deformed in an undulating manner.

14. The structure of claim 13, wherein the buckled sheet is a mechanical transformer configured to provide mechanical advantage between the one or more work input elements and the one or more bodies in communication with the machine.

15. A method for performing work on one or more bodies in communication with a buckled sheet having a sinuously-shaped profile, the method including deforming the buckled sheet wherein each point in a series of points on the sinuously-shaped profile of the buckled sheet travels at least partially along a figure eight-shaped path relative to a common frame of reference whereby the buckled sheet exerts a motion-producing force on the one or more bodies as a result of the deformation.

16. The method of claim 15, wherein the buckled sheet is deformed with substantially constant net strain energy whereby deformation of the buckled sheet is achieved without appreciable opposition from elastic restoring forces.

17. A method of fabricating a structure comprising the steps of:
    forming a sinuously-shaped profile in a compliant sheet by inducing buckling stresses therein; and
    providing at least one work input element in communication with the compliant sheet for causing each point in a series of points on the sinuously-shaped profile to travel a figure eight-shaped path relative to a common frame of reference.

18. The method of claim 17, further comprising the step of joining the compliant sheet to a support.

19. The method of claim 17, wherein the step of forming a sinuously-shaped profile in a compliant sheet comprises the step of (i) externally stressing the compliant sheet or (ii) inducing residual stresses in the compliant sheet.

20. The structure of claim 1 wherein an edge of the buckled sheet opposite the sinuously-shaped profile is connected to a support.

21. The method of claim 17, further comprising the step of elastically balancing the compliant sheet.

22. The method of claim 19, wherein the step of inducing residual stresses in the compliant sheet includes one or more of the forming processes selected from the group of: rolling, peening, planishing, and spinning.

* * * * *